United States Patent
Sadeghianpourhamami et al.

(10) Patent No.: US 12,400,156 B2
(45) Date of Patent: Aug. 26, 2025

(54) SYSTEMS AND METHODS FOR DATA-DRIVEN ENERGY MANAGEMENT OF A VEHICLE FLEET WITH ELECTRIC VEHICLES

(71) Applicant: BluWave Inc., Ottawa (CA)

(72) Inventors: Nasrin Sadeghianpourhamami, Mississauga (CA); Alexander Linchieh, Ottawa (CA); Mostafa Farrokhabadi, Ottawa (CA); Devashish Paul, Ottawa (CA)

(73) Assignee: BluWave Inc., Ottawa (CA)

( * ) Notice: Subject to any disclaimer, the term of this patent is extended or adjusted under 35 U.S.C. 154(b) by 777 days.

(21) Appl. No.: 17/102,480

(22) Filed: Nov. 24, 2020

(65) Prior Publication Data
US 2022/0164722 A1  May 26, 2022

(51) Int. Cl.
*G06Q 10/047* (2023.01)
*G01C 21/34* (2006.01)
*G06Q 10/0631* (2023.01)

(52) U.S. Cl.
CPC ....... *G06Q 10/047* (2013.01); *G01C 21/3469* (2013.01); *G06Q 10/06311* (2013.01)

(58) Field of Classification Search
CPC ..... G06Q 50/02; G06Q 10/06; G01C 21/3469
USPC .......................................................... 701/123
See application file for complete search history.

(56) References Cited

U.S. PATENT DOCUMENTS

| | | | |
|---|---|---|---|
| 2018/0038705 A1* | 2/2018 | Bills | G01C 21/3484 |
| 2019/0025818 A1* | 1/2019 | Mattingly | H04L 9/3297 |
| 2019/0176656 A1* | 6/2019 | Osgood | G07C 5/008 |
| 2020/0056892 A1* | 2/2020 | Haque | G01C 21/28 |
| 2021/0141897 A1* | 5/2021 | Seifert | G06F 21/561 |
| 2022/0121435 A1* | 4/2022 | Kreines | G01C 21/3453 |

OTHER PUBLICATIONS

Ayman et al., "Data-Driven Prediction of Route-Level Energy Use for Mixed-Vehicle Transit Fleets," Proceedings of the 6th IEEE International Conference on Smart Computing, 2020.
(Continued)

*Primary Examiner* — Marc Burgess
*Assistant Examiner* — John D Holman
(74) *Attorney, Agent, or Firm* — Borden Ladner Gervais LLP

(57) ABSTRACT

Methods and systems are provided relating to energy management of controllable assets in a system, such as vehicles in a fleet. Where the vehicle fleet has little or no historical data for a particular type of vehicle, for example electric vehicles, a data-driven based predictor for the fleet may be trained using third party data for that particular type of vehicle. This enables a data-driven control approach even when the fleet has little or no historical data of a give type. Historical data may include information relating to journeys travelled by vehicles on roads. A specific journey of a given vehicle may be subdivided into segments, and a segment signature data structure may be created and populated for each segment. The predictor(s) may be trained using data in a global repository of segment signatures. A fleet specific signature repository may be created for use by the fleet by selecting a subset of the signatures from the global repository.

20 Claims, 10 Drawing Sheets

(56) References Cited

OTHER PUBLICATIONS

Dyerson and Pilkington., "Gales of Creative Destruction and the Opportunistic Incumbent: The Case of Electric Vehicles in California," Technology Analysis and Strategic Management, Dec. 2005, vol. 17(4), pp. 391-408.

Frendo et al., "Data-driven smart charging for heterogeneous electric vehicle fleets," Energy and AI, May 2020, vol. 1, p. 100007.

Hu et al., "Electric Vehicle Fleet Management in Smart Grids: A Review of Services, Optimization and Control Aspects," Renewable and Sustainable Energy Reviews, Dec. 2015, vol. 56, pp. 1207-1226.

Li et al., "A Bayesian Approach to Unsupervised One-shot Learning of Object Categories," 9th IEEE International Conference on Computer Vision, Oct. 2003.

Mercure et al., "Integrated Assessment Modelling as a Positive Science: Private Passenger Road Transport Policies to Meet a Climate Target Well below 2 ?C," Climatic Change, 2018, vol. 151(2), pp. 109-129.

Ng et al., "Predicting the State of Charge and Health of Batteries Using Data-driven Machine Learning," Nature Machine Intelligence, Mar. 2020, vol. 2(3), pp. 161-170.

Yano et al., "Estimation of Ev Power Consumption and Route Planning Using Probe Data," Sei Technical Review, Apr. 2014. vol. 78, pp. 29-34.

\* cited by examiner

SYSTEMS AND METHODS FOR DATA-DRIVEN ENERGY MANAGEMENT OF A VEHICLE FLEET WITH ELECTRIC VEHICLES

FIELD

The present disclosure relates to vehicle fleet management, and more particularly to energy management of vehicle fleets.

BACKGROUND

Electric vehicles (EVs) are an important component in meeting global targets on climate change. According to some data, road transportation accounts for 17% of global greenhouse gas emissions, and over the last 20 years, emissions have increased by 2-3% every year. In order to avoid the severe environmental, social, and economic consequences from climate change, there is a need for a substantial decrease in greenhouse gas emissions worldwide. EVs have therefore emerged as a key component in meeting climate change goals.

Vehicle fleet operators have emerged as a natural candidate for adopting a large amount of EVs and displacing existing fossil fuel-powered vehicles. Vehicles deployed in a fleet are typically subject to high capital costs and intense usage, with the potential for decreased operational costs over time. However, due to limited operator experience with EVs, by virtue of the adoption of EVs being relatively new, information about their operation, performance, and reliability in an operational context is not as well known when compared to internal combustion engine vehicles (ICEVs). Furthermore, increased proliferation of EVs presents a challenge to electrical utility companies in the form of increased peak load and congestion in the electrical distribution network.

In addition, due to the high upfront capital cost of transitioning an entire fleet over to EVs, fleet operators have tended to adopt a gradual or partial transition during which time the fleet operator operates a mixed fleet with both EVs and ICEVs. Managing these mixed fleets productively presents a challenge for fleet operators since optimizing the assignment of both ICEV and EVs can be difficult.

Improvements in the management of mixed fleets are desired.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Embodiments of the present disclosure will now be described, by way of example only, with reference to the attached Figures.

Figure 1:
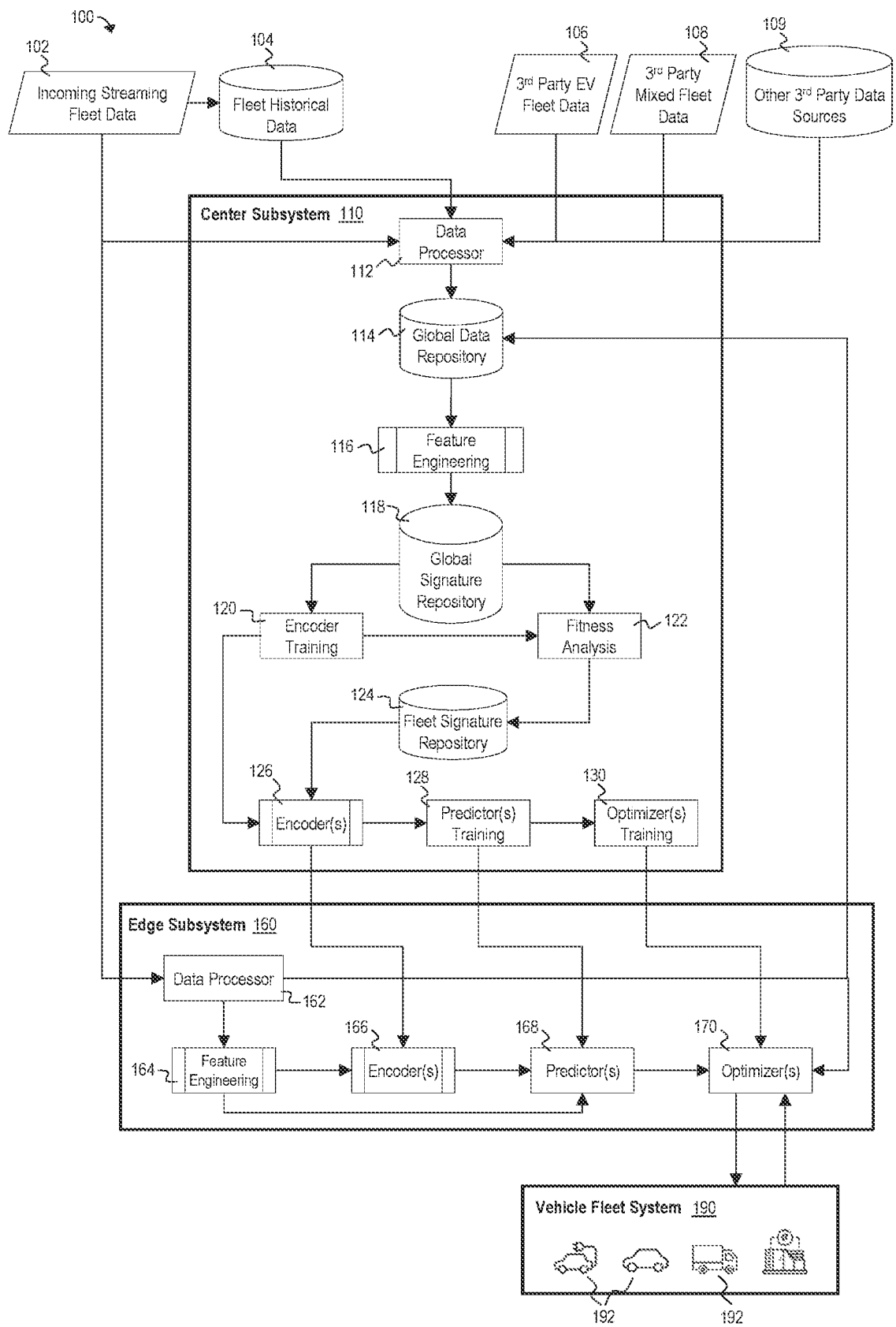
FIG. 1 is a block diagram of an example system for providing control in relation to a group of controllable assets.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

This disclosure generally relates to improvements in energy management of controllable assets in a system. In example embodiments, controllable assets include vehicles in a fleet or group of vehicles, which is referred to herein as a vehicle fleet or vehicle fleet system. In example embodiments, a vehicle fleet includes electric vehicles for which there may be little or no historical operational data. In some embodiments, a fleet may be a mixed fleet, meaning it comprises two or more different types of vehicles, such as EVs and ICEVs.

A vehicle fleet generally refers to a group of vehicles owned or leased, or otherwise operated, by a company, a government, or some other organization. Some mere examples include delivery and courier companies, trucking companies, public transportation companies, taxicab companies, and public utilities. Fleet vehicles may be managed by a fleet management system, which typically include or are based on fleet management software. Fleet vehicles may be communicatively connected to the fleet management system and/or to each other, for example for management purposes.

Vehicles may be any type or types of vehicles. They may include trucks, cars, buses, motorcycles, trains, boats, ships, other watercraft, airplanes, helicopters, other aircraft, and space craft. The vehicles may be manually operated vehicles and/or autonomous vehicles. Vehicles may be powered in any suitable way or combination of ways, including by internal combustion engine, electric motor, railway engines, nuclear power, or even human or animal power.

A mixed fleet generally refers to a fleet that has more than one vehicle type. In the present disclosure, the term mixed fleet is generally used to refer to a fleet having vehicles that are powered in two or more different ways. A mere example is a fleet that comprises both internal combustion engine vehicles and electric vehicles. However, this use of "mixed fleet" herein is not meant to be limiting.

An aspect of reducing the barriers to widespread EV adoption is the removal of operating uncertainties associated with deploying EVs in a fleet for both fleet operators and utility companies. This may be achieved by utilizing intelligent fleet control systems to satisfy one or more the following objectives: maximize fleet uptime and vehicle availability requirements; provide peak shifting and peak shaving services to the electrical distribution network; provide ancillary services to electrical system operators; provide energy trading and energy arbitrage opportunities for operators of charging infrastructure; minimize blended cost per-mile of vehicle fleet; and maximize battery longevity and health within vehicle in electric fleet.

In addition, due to the high upfront capital cost of transitioning an entire fleet over to EVs, fleet operators tend to adopt a gradual or partial transition during which time the fleet operator operates a mixed fleet with both EVs and ICEVs. Managing these mixed fleets productively can present a novel challenge for fleet operators since optimizing the assignment of both ICEV and EVs to pre-determined or dynamic routes, scheduling charging, vehicle uptime, require accurate forecasting of both electricity and fuel use.

Currently, fleet operators typically have access to a large amount of operational data for ICEV fleets from decades of operational experience and data collection from sources such as route scheduling software, GPS navigation, and refueling logs. The term operational data very generally refers to data relating to the operation of a vehicle fleet system, such as for example control information and operational environment information. However, this data may not be useful for a data-driven approach because EVs generally vary significantly from ICEVs both operationally and in terms of how energy is consumed. In many jurisdictions, ICEVs have a relatively fixed cost of energy, while EV operational costs can fluctuate throughout the day real time variable electricity pricing regimes. To complicate matters, EV energy consumption is further affected by various factors such as regenerative braking, air conditioning, and road conditions.

Current strategies used by operators to intelligently manage EV fleets include various modelling and control algorithms. While these existing approaches to smart charging have achieved increased efficiency of finite charging resources given intelligent scheduling, in practice these methods fail to adapt to complex charging behavior of both the equipment, operational demands, and human behavior.

For instance, model-based methodologies typically require accurate models of battery charging and human behavior, which are challenging to formulate. This is especially true for EV fleet optimization, where models usually require expert knowledge and are not generalizable to various situations.

Unlike the model-based approaches, data-driven approaches (based on artificial intelligence and/or machine learning algorithms) learn to identify a correct decision/attribute in various scenarios by learning from a large number of historical data. The historical data are used to train the system so that it can identify a correct decision/attribute of a test case based on its inputs.

Data-driven approaches may address some of the shortcomings of model selection by inferring from data. However, while fleet operators have accumulated a large amount of data pertaining to operating ICEVs in a fleet context, presently, for most fleets, significantly less data is available for EVs. Therefore, implementing data-driven approaches within the context of intelligent EV fleet management is challenging due to the lack of operational data available to operators. Using smaller datasets in traditional data-driven approaches is insufficient as it results in overfitting.

Accordingly, existing approaches are generally too specific, and thus may not be easily generalized for use with other fleets.

The present disclosure relates to techniques for dynamically and/or intelligently invoking various control policies and/or decisions in response to features of a control system to facilitate an improved control mechanism for exploiting the flexibility of the controllable assets in a system, such as a vehicle fleet system.

In an aspect, the present disclosure relates to techniques for utilizing existing ICEV and/or EV operational data for use within the context of training a data-driven approach for intelligent mixed vehicle fleet management, for example EV and ICEV fleet charging, when there is limited or no historic EV data for the fleet. An intelligent pre-processing and training step before control model training may be used as an effective technique for addressing this issue. The control model may be an artificial intelligence (AI) or machine learning model, for example. Operational data generally refers to data that is related to information and/or assets of a system or organization.

This approach may alternatively be used in other applications where there is a shortage of a type of data, meaning not necessarily EV operational data.

According to an aspect of the present disclosure, a vehicle fleet made up at least partly of electric vehicles may be controlled using a data-driven approach when there is little or no operational data relating to the electric vehicles for the fleet. This may be accomplished by using operational data of electric vehicles that was previously acquired from vehicles outside of the vehicle fleet, for example from one or more other fleets and/or other sources. This data is referred to herein as third party data. In this sense, the little or no EV operational data in the vehicle fleet may be supplemented with third party EV data to enable efficient and intelligent control of the vehicle fleet. In an aspect, the third party EV data may be used to train a controller or control system, such as an AI-based or machine learning based controller, for the fleet. Further, the third party EV data may be used to train other modules in the overall fleet control system, including AI and/or machine learning-based modules. Consequently, data-driven approaches relating to controlling the vehicle fleet having EVs may be used when there is little or no EV operational data for the particular fleet. In some embodiments, the third party data may be used initially for controlling the vehicle fleet, but the use of the third party data may decrease and/or stop over time as the vehicle fleet generates its own data. The algorithms for controlling the vehicle fleet may then be trained using its own data.

According to an aspect of the present disclosure, in a vehicle fleet system having little or no relevant data for EVs, historical third party ICEV and EV related data (meaning data obtained from vehicles outside of the present vehicle fleet system) may be used to estimate data values for EVs in the vehicle fleet system using the third party data. As a mere example, the vehicle fleet system may not know how much electric energy will be consumed by a particular type of EV in the fleet to travel a particular distance in certain road conditions. The vehicle fleet system may be able to leverage the historical third party vehicle related data to estimate an electric energy consumption value for the EV in its fleet. In an aspect, the historical third party data may be used to train a machine learning based predictor. The trained predictor may then be used to estimate data values for EVs or other vehicles or controllable assets in the fleet.

According to an aspect of the present disclosure, operational data of vehicles may be subdivided to form more useful blocks of information, herein referred to as segment signatures or sometimes simply as signatures. In particular, operational data may comprise historical data of specific vehicles as they traveled on specific journeys. As an example, vehicle A as it traveled from point X to point Y on day Z. The data relating to the vehicle and its travel on the journey, namely from point X to point Y, may be divided up by subdividing the journey into one or more segments. For each segment of the journey, data relating to that particular segment of the journey may be organized into a segment signature.

A segment signature may include any type of suitable information or data relating to the travel of the vehicle on the particular segment of the journey. Data may include information on the type of vehicle, road conditions, driver inputs to the vehicle, and/or route data. A segment signature may be a standardized representation characterizing a travel made by a vehicle, over a road segment that may have been generated from unstructured and/or irregular data obtained from a one or more various sources.

A predictor for a vehicle fleet system may be trained using data comprising segment signatures. Further, a trained predictor may be used on streaming data of the fleet to make predictions to be used for making control and/or optimization decisions, where the streaming data may be converted into segment signatures for use by the predictor that was trained on segment signatures. In an embodiment, some or all of the training data may comprise third party data, for example if the fleet has little or no suitable training data in relation to a particular type of vehicle or any other asset.

According to an aspect of the present disclosure, an encoder is used to convert, or encode, operational data, for instance in the form of a segment signature, into a vector representation. Further, the encoder may be used to compare operational data, for instance in the form of segment signatures, by encoding at least two data records, in the form of segment signatures, into vectors and then comparing the at least two vectors. Further, the encoder may be used to generate a customized subset of data by selecting data records from another dataset. The selecting may involve comparing a test record to records in the other subset, and adding records from the other subset to the customized subset when the comparison satisfies a defined condition (such as a minimum similarity between the test record and the other record). In an embodiment, the records may be segment signatures.

According to an aspect, the present disclosure is directed to a method comprising, at one or more electronic devices each having one or more processors and memory, generating a vehicle fleet specific signature dataset for use with a vehicle fleet, the generating comprising selecting a candidate segment signature comprising data relating to a first journey traveled by a first vehicle not in the vehicle fleet, wherein a segment signature comprises feature data relating to a segment of a journey traveled by a vehicle where the journey has been subdivided into a plurality of segments, selecting a test segment signature comprising data relating to a second journey traveled by a second vehicle in the vehicle fleet, encoding data in the candidate segment signature into a candidate vector and encoding data in the test segment signature into a test vector, determining a level of similarity between the test vector and the candidate vector, adding the candidate segment signature to the vehicle fleet specific signature dataset if the level of similarity exceeds a predetermined threshold.

In an embodiment, the method further comprises training a data-driven predictor using data from the vehicle fleet specific signature dataset, the predictor for estimating data values for use in controlling the vehicle fleet.

In an embodiment, the second vehicle is an electric vehicle.

In an embodiment, the determining a level of similarity comprises calculating a distance between the test vector and the candidate vector, the method further comprising passing the distance through a sigmoid function to generate a similarity score, wherein the candidate segment signature is added to the vehicle fleet specific signature dataset if the similarity score exceeds a predetermined threshold.

In an embodiment, the encoding and the determining a level of similarity involve the use of a Siamese neural network.

In an embodiment, the method further comprises, as new segment signatures relating to journeys traveled by vehicles in the vehicle fleet are created, adding at least some of the new segment signatures to the vehicle fleet specific signature dataset.

In an embodiment, the feature data of segment signatures comprises information relating to one or more of a characteristic of a type of the vehicle that traveled the journey segment, to a characteristic of road conditions of the journey segment, and/or to a characteristic of driver inputs to the vehicle during the journey segment.

According to an aspect, the present disclosure is directed to a system, comprising one or more processors, and memory storing instructions for execution by the one or more processors, the instructions for operations comprising generating a vehicle fleet specific signature dataset for use with a vehicle fleet, the generating comprising selecting a candidate segment signature comprising data relating to a first journey traveled by a first vehicle not in the vehicle fleet, wherein a segment signature comprises feature data relating to a segment of a journey traveled by a vehicle where the journey has been subdivided into a plurality of segments, selecting a test segment signature comprising data relating to a second journey traveled by a second vehicle in the vehicle fleet, encoding data in the candidate segment signature into a candidate vector and encoding data in the test segment signature into a test vector, determining a level of similarity between the test vector and the candidate vector, adding the candidate segment signature to the vehicle fleet specific signature dataset if the level of similarity exceeds a predetermined threshold.

In an embodiment, the operations further comprise training a data-driven predictor using data from the vehicle fleet specific signature dataset, the predictor for estimating data values for use in controlling the vehicle fleet.

In an embodiment, the determining a level of similarity comprises calculating a distance between the test vector and the candidate vector, the method further comprising passing the distance through a sigmoid function to generate a similarity score, wherein the candidate segment signature is added to the vehicle fleet specific signature dataset if the similarity score exceeds a predetermined threshold.

In an embodiment, the encoding and the determining a level of similarity involve the use of a Siamese neural network.

In an embodiment, the operations further comprise, as new segment signatures relating to journeys traveled by vehicles in the vehicle fleet are created, adding at least some of the new segment signatures to the vehicle fleet specific signature dataset.

In an embodiment, the feature data of segment signatures comprises information relating to one or more of a characteristic of a type of the vehicle that traveled the journey segment, to a characteristic of road conditions of the journey segment, and/or to a characteristic of driver inputs to the vehicle during the journey segment.

According to an aspect, the present disclosure is directed to a non-transitory computer-readable medium having computer-readable instructions stored thereon, the computer-readable instructions executable by at least one processor to cause the performance of operations comprising generating a vehicle fleet specific signature dataset for use with a vehicle fleet, the generating comprising selecting a candidate segment signature comprising data relating to a first journey traveled by a first vehicle not in the vehicle fleet, wherein a segment signature comprises feature data relating to a segment of a journey traveled by a vehicle where the journey has been subdivided into a plurality of segments, selecting a test segment signature comprising data relating to a second journey traveled by a second vehicle in the vehicle fleet, encoding data in the candidate segment signature into a candidate vector and encoding data in the test segment signature into a test vector, determining a level of similarity between the test vector and the candidate vector, adding the candidate segment signature to the vehicle fleet specific signature dataset if the level of similarity exceeds a predetermined threshold.

In an embodiment, the operations further comprise training a data-driven predictor using data from the vehicle fleet specific signature dataset, the predictor for estimating data values for use in controlling the vehicle fleet.

In an embodiment, the second vehicle is an electric vehicle.

In an embodiment, the determining a level of similarity comprises calculating a distance between the test vector and the candidate vector, the method further comprising passing the distance through a sigmoid function to generate a similarity score, wherein the candidate segment signature is added to the vehicle fleet specific signature dataset if the similarity score exceeds a predetermined threshold.

In an embodiment, the encoding and the determining a level of similarity involve the use of a Siamese neural network.

In an embodiment, the instructions for operations further comprise, as new segment signatures relating to journeys traveled by vehicles in the vehicle fleet are created, adding at least some of the new segment signatures to the vehicle fleet specific signature dataset.

In an embodiment, the feature data of segment signatures comprises information relating to one or more of a characteristic of a type of the vehicle that traveled the journey segment, to a characteristic of road conditions of the journey segment, and/or to a characteristic of driver inputs to the vehicle during the journey segment.

According to an aspect, the present disclosure is directed to a method comprising, at one or more electronic devices each having one or more processors and memory, acquiring training data comprising a plurality of segment signatures, wherein a segment signature comprises feature data, the feature data relating to a segment of a journey traveled by a vehicle, wherein the journey has been subdivided into one or more segments, and training a predictor using the training data, the predictor for estimating data values for use in controlling a plurality of controllable assets in a vehicle fleet system.

In an embodiment, the method further comprises, prior to the acquiring, generating one or more of the plurality of segment signatures, the one or more of the plurality of segment signatures relating to a journey previously traveled by a vehicle not in the vehicle fleet system.

In an embodiment, the method further comprises controlling, using a controller, the plurality of controllable assets in the vehicle fleet system, wherein the controlling comprises receiving new journey information associated with the vehicle fleet system, the new journey information relating to a new journey to be traveled, subdividing the new journey into at least one new journey segment, generating, for each of the at least one new journey segment, a new segment signature, and assigning a label to the new segment signature, the label based on the feature data of the new segment signature, wherein the controlling the plurality of controllable assets in the vehicle fleet system is based on the label assigned to the new journey segment.

In an embodiment, the assigning a label to a new segment signature comprises estimating the label using the predictor that has been trained using historical data from the vehicle fleet system.

In an embodiment, the controlling the plurality of controllable assets comprises solving an optimization problem, and wherein assigned labels of segment signatures are inputs to the optimization problem.

In an embodiment, the method further comprises controlling, using a controller, a vehicle in the vehicle fleet system by identifying a remaining portion of a route of the vehicle after the vehicle has already started on the route, the remaining portion being between a location of the vehicle on the route and a destination of the route, identifying one or more possible journeys from the location of the vehicle to the destination, subdividing each of the one or more possible journeys into at least one new journey segment, generating, for each of the at least one new journey segment, a new segment signature comprising a label, and selecting one of the one or more possible journeys based on the labels of the at least one new journey segments.

In an embodiment, the feature data of segment signatures comprises information relating to one or more of a characteristic of a type of the vehicle that traveled the journey segment, to a characteristic of road conditions of the journey segment, and/or to a characteristic of driver inputs to the vehicle during the journey segment.

According to an aspect, the present disclosure is directed to a system, comprising one or more processors, and memory storing instructions for execution by the one or more processors, the instructions for operations comprising acquiring training data comprising a plurality of segment signatures, wherein a segment signature comprises feature data, the feature data relating to a segment of a journey traveled by a vehicle, wherein the journey has been subdivided into one or more segments, and training a predictor using the training data, the predictor for estimating data values for use in controlling a plurality of controllable assets in a vehicle fleet system.

In an embodiment, the operations further comprise, prior to the acquiring, generating one or more of the plurality of segment signatures, the one or more of the plurality of segment signatures relating to a journey previously traveled by a vehicle not in the vehicle fleet system.

In an embodiment, the operations further comprise controlling, using a controller, the plurality of controllable assets in the vehicle fleet system, wherein the controlling comprises receiving new journey information associated with the vehicle fleet system, the new journey information relating to a new journey to be traveled, subdividing the new journey into at least one new journey segment, generating, for each of the at least one new journey segment, a new segment signature, and assigning a label to the new segment signature, the label based on the feature data of the new segment signature, wherein the controlling the plurality of controllable assets in the vehicle fleet system is based on the label assigned to the new journey segment.

In an embodiment, the assigning a label to a new segment signature comprises estimating the label using the predictor.

In an embodiment, the controlling the plurality of controllable assets comprises solving an optimization problem, and wherein assigned labels of segment signatures are inputs to the optimization problem.

In an embodiment, the operations further comprise controlling, using a controller, a vehicle in the vehicle fleet system by identifying a remaining portion of a route of the vehicle after the vehicle has already started on the route, the remaining portion being between a location of the vehicle on the route and a destination of the route, identifying one or more possible journeys from the location of the vehicle to the destination, subdividing each of the one or more possible journeys into at least one new journey segment, generating, for each of the at least one new journey segment, a new segment signature comprising a label, and selecting one of the one or more possible journeys based on the labels of the at least one new journey segments.

According to an aspect, the present disclosure is directed to a non-transitory computer-readable medium having computer-readable instructions stored thereon, the computer-readable instructions executable by at least one processor to cause the performance of operations comprising acquiring training data comprising a plurality of segment signatures, wherein a segment signature comprises feature data, the feature data relating to a segment of a journey traveled by a vehicle, wherein the journey has been subdivided into one or more segments, and training a predictor using the training data, the predictor for estimating data values for use in controlling a plurality of controllable assets in a vehicle fleet system.

In an embodiment, the operations further comprise prior to the acquiring, generating one or more of the plurality of segment signatures, the one or more of the plurality of segment signatures relating to a journey previously traveled by a vehicle not in the vehicle fleet system.

In an embodiment, the operations further comprising controlling, using the controller, the plurality of controllable assets in the vehicle fleet system, wherein the controlling comprises receiving new journey information associated with the vehicle fleet system, the new journey information relating to a new journey to be traveled, subdividing the new journey into at least one new journey segment, generating, for each of the at least one new journey segment, a new segment signature, and assigning a label to the new segment signature, the label based on the feature data of the new segment signature, wherein the controlling the plurality of controllable assets in the vehicle fleet system is based on the label assigned to the new journey segment.

In an embodiment, the assigning a label to a new segment signature comprises estimating the label using the predictor.

In an embodiment, the controlling the plurality of controllable assets comprises solving an optimization problem, and wherein assigned labels of segment signatures are inputs to the optimization problem.

In an embodiment, the operations further comprise controlling, using a controller, a vehicle in the vehicle fleet system by identifying a remaining portion of a route of the vehicle after the vehicle has already started on the route, the remaining portion being between a location of the vehicle on the route and a destination of the route, identifying one or more possible journeys from the location of the vehicle to the destination, subdividing each of the one or more possible journeys into at least one new journey segment, generating, for each of the at least one new journey segment, a new segment signature comprising a label, and selecting one of the one or more possible journeys based on the labels of the at least one new journey segments.

In an embodiment, the feature data of segment signatures comprises information relating to one or more of a characteristic of a type of the vehicle that traveled the journey segment, to a characteristic of road conditions of the journey segment, and/or to a characteristic of driver inputs to the vehicle during the journey segment.

Aspects and advantages according to the present disclosure will be apparent from the following, taken in conjunction with the accompanying drawings, wherein are set forth, by way of illustration and example only, certain embodiments according to the present disclosure.

For descriptive purposes, several aspects, embodiments, and features according to the present disclosure are described in relation to vehicles and vehicle fleets, and in particular to motor vehicles that travel on roads. However, this is not intended to be limiting. The teachings according to the present disclosure may be applied to fields and technologies other than vehicles and vehicle fleets, and motor vehicles, including but not limited to other types of controllable assets.

FIG. 1 is a block diagram of an example system 100 for providing control in relation to a group of controllable assets according to the present disclosure. In this embodiment, the controllable assets include a plurality of vehicles 192 of a vehicle fleet system 190. The controllable assets refer to any controllable load, for instance within a fleet management context. Examples include charging infrastructure, EV batteries, battery energy storage systems, building management systems, to name but a few.

Further, in this embodiment, system 100 is shown as comprising center subsystem 110 and edge subsystem 160, which cooperate to control the vehicle fleet system 190. It is to be appreciated, however, that in other embodiments, system 100 may not be subdivided into center subsystem 110 and edge subsystem 160 as herein shown and described.

Center subsystem 110 may generally comprise, among others, one or more of data processor module 112, global data repository or database 114, feature engineering module 116, global signature repository or database 118.

Center subsystem 110 may receive various types of information, such as historical operational data, for example data from one or more of third party EV fleet 106, third party mixed fleet 108, and other third party sources 109. This historical data/may come from various sources, including but not limited to third parties such as vehicle manufacturer, fleet operators, geographic information systems, traffic controllers, and/or energy market entities. Energy market information may include, for example, information relating to predicted or forecasted energy prices, day ahead energy market prices, time of use energy prices, primary reserve market energy prices, axillary reserve market energy prices, renewable energy prices, local renewable energy prices, or any combination thereof. Further, center subsystem 110 may receive historical fleet data 104 of vehicle fleet system 190, which may be stored in a database, and/or streaming or recent fleet data 102 from vehicle fleet system 190. Streaming data may refer to real-time or near real-time data.

Data processor module 112 may perform general processing functions, as well as data cleaning, data conditioning, data warehousing, data aggregation, and/or other operations on some or all of the received data.

The concept of data aggregation may be used when generating segment signatures. Generally, the concept of aggregation involves grouping data features having similar values together and representing them as effectively having the same value. This concept may be used to make segment signatures having similar but different values for a given data feature be essentially the same. This may avoid having a very high number of signatures that are not similar. This may be useful later on when signatures are compared to one another for various purposes, as described below. When two signatures are pretty similar in terms of their values for one or more feature data fields, it is desirable, in at least some embodiments, that the present system consider these signatures to be similar. As a mere example, vehicle speed of a vehicle over the particular segment of the road or journey, as a feature data field, may have its possible values binned together. One bin may include speeds of 0 to 10 km/h, another bin may include speeds in the range of 10 to 50 km/h, another bin may include speeds in the range of 50 to 80 km/h, etc. Thus, as stored in a signature, the vehicle speed may be generalized from the actual value to a value range, for example from "44.6 km/h" to "10 to 50 km/h". In another example, weather may be represented by discrete features such as cold, warm, hot, sunny, windy, rainy, snowy, etc.

Mere examples of feature data fields in a signature include vehicle type (such as truck, car, bus), vehicle motor type (for instance internal combustion, or electric), road type, road conditions, driver inputs, energy or fuel consumption, time of availability for charging, vehicle energy requirement per charging session, vehicle required charging time per charging session, time remaining until vehicle departure, scheduled time of departure, flexibility in terms of duration and/or amount of deferrable energy, similar time of availability, similar energy requirement per charging session.

Data at central subsystem may be stored in global data repository database 114. Global data repository may contain various forms of data, including but not limited to streaming live and historical data that have been pre-processed. The data in this repository may have different types, including structured and unstructured data, formats, and granularities. Some examples include: GPS coordinates, weather observations and forecasts (such as temperature, humidity, wind, sun, precipitation, cloud types, cloud cover), geographic data (such as maps, topology, etc.), road network information (road maps, traffic control, traffic volumes). Furthermore, the data may be associated with various different fleet operators or independently recorded EV data (e.g., EV journeys in pilot test projects, publicly available EV charging datasets, etc.).

Feature engineering module 116 constructs a comprehensive representation of input data such that the data recorded in a prior use-case may be used in a present use-case. A prior use-case may be another vehicle fleet, or any other use of a vehicle. A present use-case may the current vehicle fleet system 190 being controlled. To achieve this, a notion of the "signature" is introduced. A signature is set of features that represent a journey made by a vehicle over a road(s) segment at a particular time.

Feature engineering module 116 generates segment signatures based on data from, for example, global data repository database 114. As previously described, historical operational data of vehicles may be subdivided to form more useful blocks of information referred to as segment signatures.

The data received at feature engineering module 116 may comprise historical data of specific vehicles as they traveled on specific journeys. The data may be comprised of various types of data originating from various different fleet operators, independent third parties, etc. The composition of some of these datasets may have abundance of journeys traveled with EVs while some other may have larger ICEV or hybrid vehicle recordings.

Figure 2:
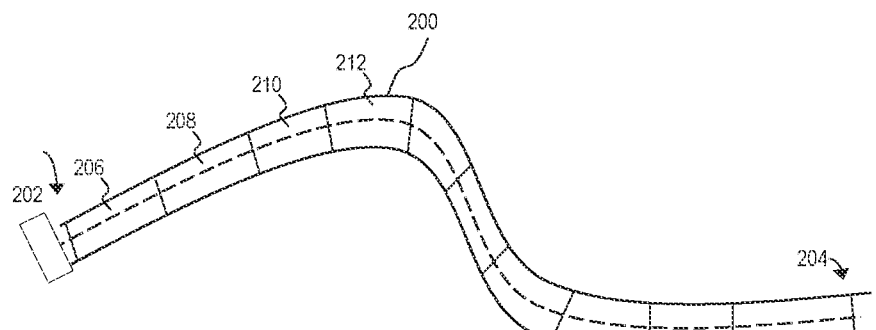
FIG. 2 is an example representation of a journey of a vehicle from a first location to a destination location.

FIG. 2 is an example representation of a journey 200 of a vehicle from a first location 202 to a destination location 204. Data relating to the vehicle and its travel on journey 200, may be divided up by subdividing the journey into one or more segments 206, 208, 210, 212. This dividing is referred to as journey segmentation and may be performed by feature engineering module 116. For each segment of the journey, data relating to that particular segment of the journey may be organized into a segment signature. A journey may be segmented and represented with segment signatures based on one or more various features. Example features may include GPS, weather, geographic, traffic, and/or time. In an embodiment, a journey may be segmented by subdividing the journey based on a fixed length of road or journey, for example 100 m long segments. In an embodiment, a journey may be segmented based on the type of road, for example whether portions of the journey are on a highway, a road, or a freeway. In an embodiment, a journey may be segmented based on elevation over the journey, for example inclined, flat, and declined portions of the journey. Further, in some embodiments, a signature does not just represent a road segment, but rather it represents "a journey traveled over a road segment by a vehicle". Accordingly, if an exact same road segment is traveled by an EV on a sunny day, the signature may be different from a signature corresponding to the same segment traveled by the same vehicle on a rainy day.

A segment signature may include any type of suitable information or data relating to the travel of the vehicle on the particular segment of the journey. Data may include information on the type of vehicle (such as truck, model, type of engine, weight, size, etc.), road conditions (such as gradient of the road, road type such as city street or highway, road surface such as pavement, stone, or dirt, environmental factors such as rain, snow or ice, road hazards such as holes, construction, or traffic), driver inputs (such as acceleration, speed, stops, braking), and/or route data (such as fuel or energy consumed, distance traveled, time and day).

Figure 3:
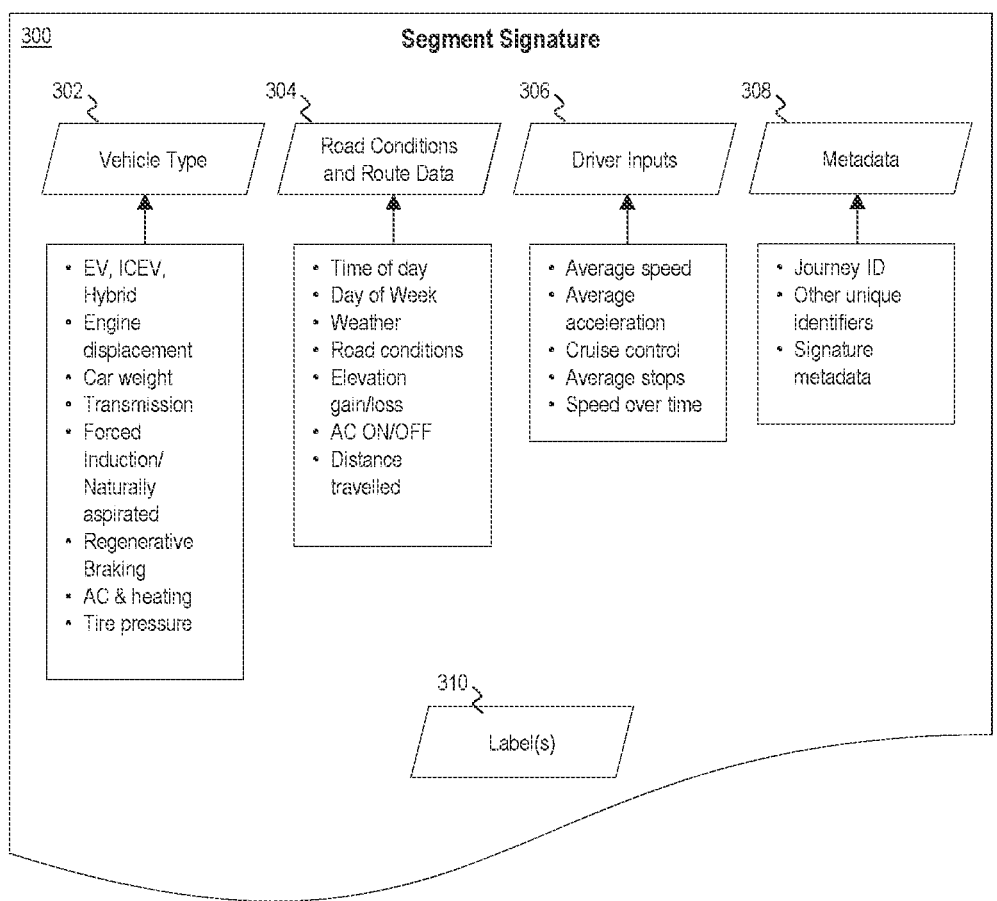
FIG. 3 is a diagram showing an example data structure representation of a segment signature.

FIG. 3 is a diagram showing an example data structure 300 representation of a segment signature with merely example categories of data and data fields. The information and data in a segment signature is generally referred to as features or feature data. Example categories include vehicle type 302, road conditions and/or route data 304, driver inputs 306, and/or metadata 308. Vehicle type data 302 may include, for example, one or more of EV, ICEV, hybrid, engine displacement, vehicle weight, transmission type, forced induction/naturally aspirated, regenerative braking, air conditioning (AC), heating, and tire pressure. Road conditions and/or route data 304 may include, for example, one or more of time of day, day of week, weather, road conditions, elevation gain/loss, AC on/off, distance travelled. Driver inputs data 306 may include, for example, one or more of average speed, average acceleration, cruise control, average stops, and speed over time. Metadata 308 may include, for example, one or more of journey ID, other unique identifiers, and signature metadata.

In addition to feature data, a segment signature may also comprise one or more labels 310. Similar to feature data, a label may be information that is also a feature or characteristic relating to the segment of the journey traveled by the vehicle. A label may be data in the feature data of the signature, meaning a data field in the feature data may be designated as a label(s). A difference between a value in a data field and a label is that a label may be used by a controller of system 100, which may include an optimizer(s), for making control decisions and/or optimizations. For instance, label or estimated label information may be used as input to an optimizer.

For example, an example factor for using in determining which vehicle type to dispatch to a particular route is an amount of energy or fuel the vehicle would consume. Hence, energy consumption and/or fuel consumption are examples of labels for segment signatures. Other example types of labels are battery degradation, and CO2 emission, for instance. In an embodiment, the segment signatures have the same type of label(s), meaning the labels are of the same data field. In an illustrative example, a segment signature could have the following feature data and label:

| field | value |
| --- | --- |
| vehicle type | semi-tractor-trailer truck |
| motor type | electric |
| road type | highway |
| road gradient | flat |
| time of day | evening (5-10 pm) |
| average speed | 97 km/h |
| distance | 1.2 km |
| label → energy consumed | 1.5 kW · h |

In a case where a segment signature does not have data populating the label field, system 100 may assign a label value, for example by estimating the label value. If it is not possible or feasible, or desired, to assign a label value to segment signature that has an empty label field, the segment signature may be disregarded, or removed from the relevant repository or database. In an embodiment, the assigning of label values may be done by feature engineering module 116.

In an embodiment, at least some feature data of at least some of the plurality of segment signatures comprises no information that directly identifies specifics relating to the source of the data. For instance, a signature may not contain any geographical location information (e.g. GPS coordinates, country, city, road name) relating to the segment of a journey associated with the signature. Similarly, a signature may not include any identifying information on the specific vehicle that traveled the segment, for example vehicle identification number (VIN), vehicle owner, vehicle operator or driver, etc. The same may apply to all information contained in a signature. In an embodiment, such information may be removed from the data so that it is not present in a signature. This may make the data in the signatures anonymous, which may be an important factor for the source of the data agreeing to share the data outside of its organization. For instance, if the data contained identifying information and/or sensitive or secret information, the source of the information may be reluctant to share it.

Figure 4:
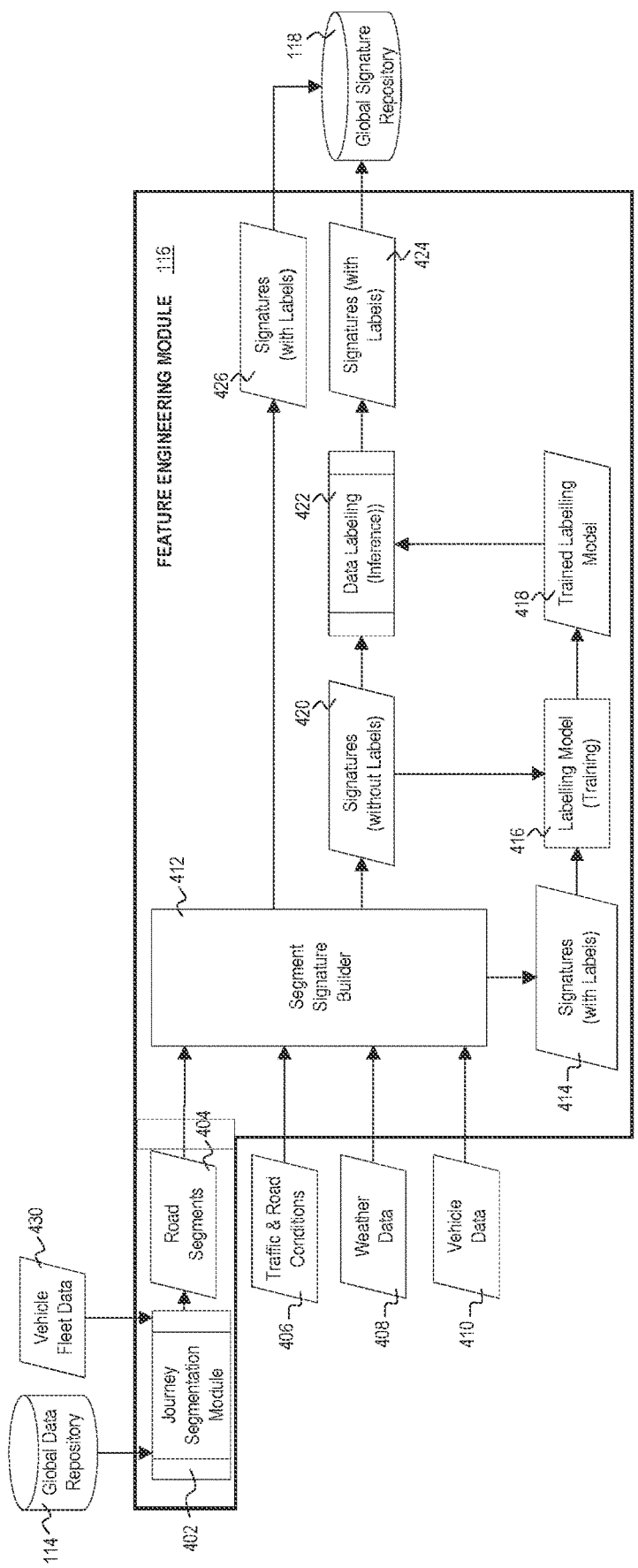
FIG. 4 is a block diagram of an example feature engineering module.

FIG. 4 is a block diagram of an example feature engineering module 116. To build such signatures, data from global data repository 114 and/or data from the use-case vehicle fleet system 430, such as live streaming data, may be pre-processed, and fed through a segmentation algorithm in journey segmentation module 402. Journey segmentation module 402 splits the routes traveled into segmented road segments, which may then be fed to segment signature builder module 412.

Segment signature builder module 412 may construct a signature for each segment by using information such as timing, traffic, road characteristics, weather features, vehicle speed, vehicle acceleration, etc. Signature builder module 412 may perform one or more of the following: handling data irregularities such as difference in measurement units and frequencies, handling missing features from one dataset to another, and handling feature selection/elimination. Feature selection refers to the process of reviewing datasets to select a subset of relevant features for use in model construction. Example inputs to signature builder module 412 include one or more of data from global data repository 114, vehicle fleet system data 430, journey or road segments 404, traffic and/or road conditions data 406, weather data 408, and vehicle data 410. For generating signatures based on historical data, for instance to build up global signature repository 118, then historical data may be used. For generating signatures based on current or streaming data, then current data may be used.

An example of handling missing features may involve "filling-in" some/all of the missing features from one dataset to another. This may include a scenario where a temperature recording is missing from the logs of an EV traveling a journey and features associated with the weather are added to the signature from an independent third-party providing weather data. Another example of handling or "filling-in" missing features from one dataset to another involves using one or more of traffic and road conditions data 406 and weather data 408 to estimate the speed profile of a road segment. In this instance, the speed profile corresponds to the speed of a vehicle as it traverses a road segment.

Further, feature engineering module 116 may add or assign one or more labels to each segment signature. System 100 may be configured by specifying one or more specific labels to be used. In an example, the labels could be fuel consumption for ICEV and electric energy consumption for EVs. Data associated with a given segment being inputted into signature builder module 412 may already have data corresponding to the label. For instance, where a label is fuel consumption during the journey segment, data for an ICEV for that segment may include fuel consumption data. Again, where a segment signature does not have data populating the label field, for example in a data record for an ICEV that does not have an electric energy consumption value, signature builder module 412 may assign a label value, for example by estimating the label value using data labeling module 422. If it is not possible or feasible, or desired, to assign a label value to segment signature that has an empty label field, the segment signature may be disregarded, meaning for example that it is not stored in a signature repository such as global signature repository database 118.

An example of estimating a missing label value for a segment signature is as follows. If a segment was traveled by an ICEV, it would only have fuel (e.g. gasoline or diesel) consumption information and not electric energy consumption information. In at least some datasets with an abundance of EV and ICEV data, it is possible to train predictive models by leveraging the consolidated EV and ICEV data to estimate a missing label.

With reference to FIG. 4, signatures 426 having data for all of the label(s) may be stored in global signature repository 118. Further, signatures 414 having data for all of the label(s) and/or signatures 420 not having data for all of the label(s) may be inputted into a labelling model training module 416. Labelling model training module 416 trains a labelling model 418 from historical data, often abundant, of the use-case fleet to estimate the labels for signatures with missing label or labels. Trained labelling model 418 may be used by a data labelling module 422 to generate, by estimating, label values for segment signatures 420 that are missing one or more label values. Data labelling module 422 estimates label value(s) for a signature with missing labels that was generated using data from the use-case fleet. Note that data labelling may not be done in scenarios where insufficient data from the same use-case fleet is available to train labelling model 418 used in data labelling module 422 and hence, the signatures with missing label values may be disregarded or discarded. Data labelling module 422 may employ machine learning algorithms in an embodiment. Further, data labelling module 422 is separate from predictor(s) in predictor module 168, and/or labelling model training module 416 is separate from predictor training module 128, in an embodiment. Data labelling module 422 may be different from predictor module(s) 168, described below, architecturally and/or in terms of their input data.

A difference between data labelling module 422 and predictor module(s) 168 is that labelling model training module 416 trains a predictor, trained labelling model 418, if there is sufficient data available to do so from data of the present use-case fleet. Also, the input data does not need to be in form of a signature. In a mere example, a use-case where there is sufficient EV data, a label is chosen to be energy consumption. There may be many (e.g. thousands) signatures with labels but only a few signatures with missing label values. It may be possible to leverage the many data to build a predictor, namely trained labelling model 418, in data labelling module 422 to estimate energy consumption of a signature for which the label value is missing. It is not necessarily required to have signatures as inputs to this predictor. In an example embodiment, trained labelling model 418 may comprise a simple mapping between vehicle speed and energy consumption, for instance simply because the required data exists. In a scenario where there is not sufficient data to train labelling model 418, then signatures with missing label values may be disregarded and/or discarded.

Once label value(s) are estimated for signatures that are missing data for at least some of the labels, the labels are populated with the estimated values. These signatures 424 may be stored in global signature repository 118.

In at least some embodiments, global signature repository 118 comprise signatures that are based on third party data, meaning data that originates from outside of the present use-case vehicle fleet system 190. A portion, a majority, or a totality of the signatures in global signature repository 118 may originate from third party data.

Output of feature engineering model 116 is a signature that represents characteristics of a journey traveled by a vehicle over a road segment and has an associated label(s). While the features, meaning data field(s) constituting the segment signature, and its label(s) are generally preselected and configured for a particular vehicle fleet system use-case, the method for generating signatures, the content of the signatures, and/or the associated label(s) may differ among embodiments.

Figure 5:
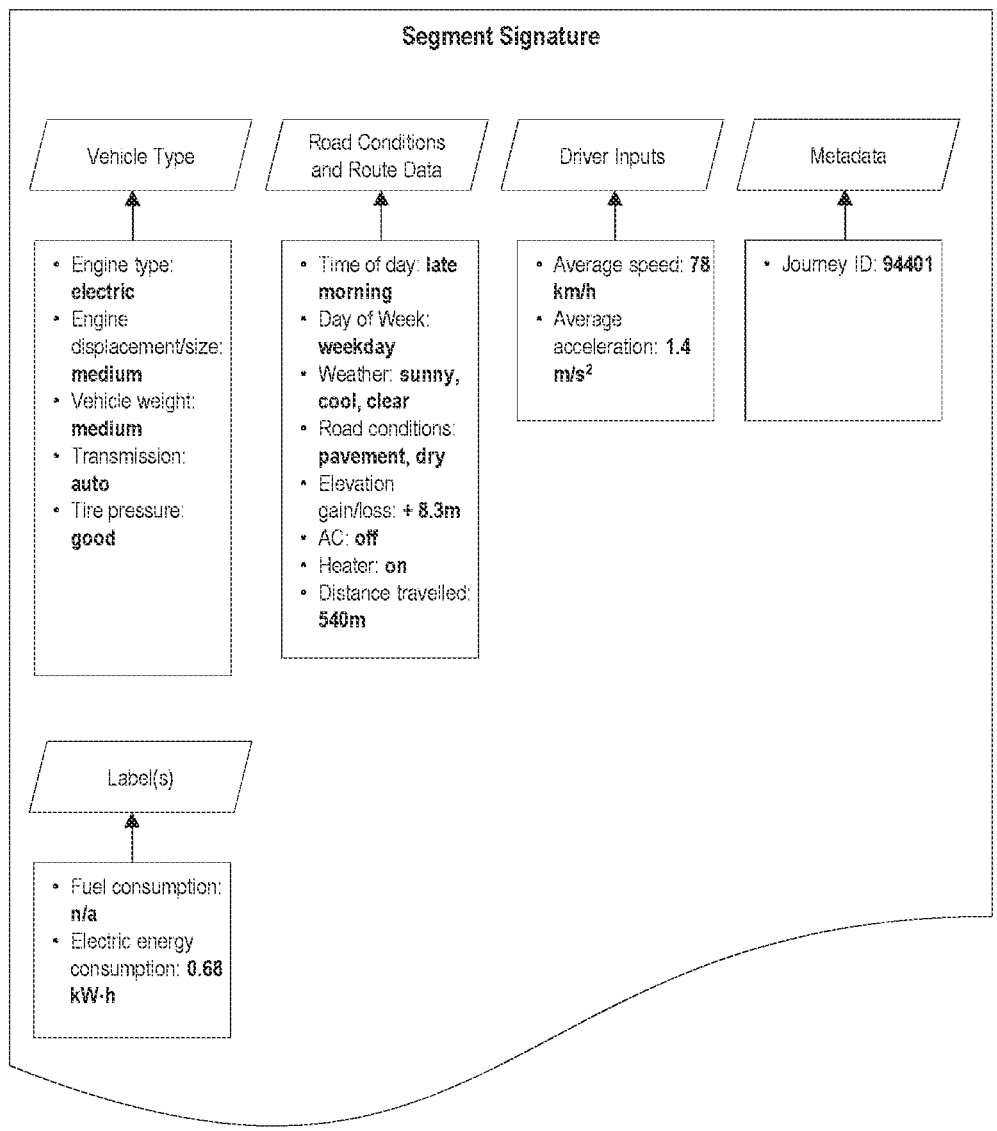
FIG. 5 is a diagram of an example segment signature with example data.

FIG. 5 is a diagram of an example segment signature with example data.

Referring back to FIG. 1, segment signatures in global signature repository 118 may be inputted into encoder training module 120 for training one or more encoders 126 of system 100. An encoder may be a machine learning based encoder that has been trained using training data. In an embodiment, there may be an encoder for each label used by system 100 since each encoder may encode feature data of a signature based on a single label. Thus, if each segment has L labels, then system 100 may comprise L encoders.

An encoder may be used to encode a segment signature into a vector representation. A purpose of an encoder is to create a vector form representation (encoding) for a given set of input data to allow for a mathematical comparison of the data. Any suitable type of encoder or encoding algorithm(s) may be used. In an embodiment, to allow for a useful comparison of vectors, the two inputs to the encoder have the same data format, meaning the same data structure. In an embodiment, the data structure is a segment signature. More specifically, feature data of a signature is encoded into a vector. A vector representation may be used to compare data, such as segment signatures, by encoding at least two data records into vectors and then comparing the at least two vectors by for example computing the distance between the vectors. Further, the encoder may be used to generate a customized subset of signatures by selecting records from global signature repository.

Encoder training module 120 is generally responsible for training an encoder 126 to be used for converting, or "encoding", a journey segment signature into a vector representation. One-shot learning techniques may be used in architecting and training encoder 126.

In encoder training module 120, signatures from global signature repository 118 having similar label values may be binned together and may be assigned an identical tag. The granularity, represented by the binning width, may be a tunable hyperparameter. For example, if a label of each signature is electric energy consumption in the range of 0 to $E_{max}$, and this range is partitioned into N number of bins, then the first bin may be assigned the signatures whose energy consumption values are between 0 and $E_{max}/N$, and those signatures may be assigned a tag number that is identical.

In an embodiment, encoder 126 may be trained based on the concept derived from one-shot learning, wherein a system may only observe a single example (e.g. reference data) before making a prediction on a test case (e.g. test data). If two signatures have the same tag, the distance between their encoded feature vectors should be smaller than a magnitude (epsilon, $\epsilon$) which is a hyperparameter that may also be tuned. In other words:

$$\text{if Tag}(S_i) = \text{Tag}(S_j) \rightarrow \|f(S_i) - f(S_j)\|^2 < \epsilon$$

where Si and Sj are two different signatures and f(Si) and f(Sj) are encoded vectors of Si and Sj respectively. It is noted that distance has various mathematical definitions and this is just one example.

An example type of encoder may be based on Siamese neural networks, which may be adapted from a machine vision domain in image classification applications to estimate similarities between two vector representations of segment signatures. Siamese neural networks have two identical subnetworks, meaning the subnetworks are configured with the same parameters and weights. The parameters are updated in a mirrored fashion in both subnetworks.

The Siamese neural networks are used to find the similarity of the inputs by comparing their feature vectors.

Figure 6:
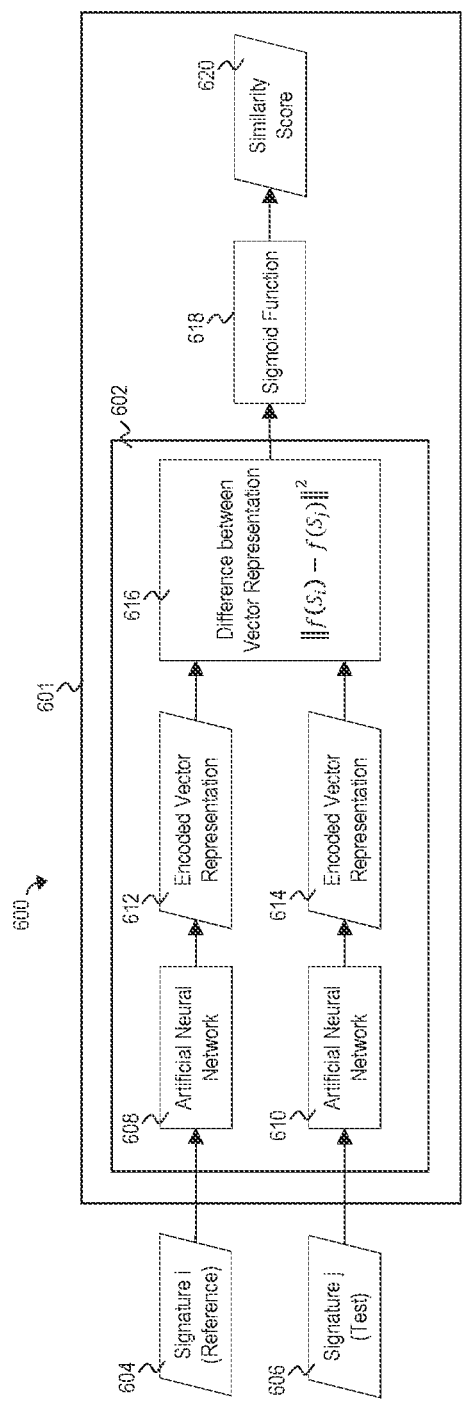
FIG. 6 is a block diagram of an example subsystem for encoding two or more data records into vectors and then determining a level of similarity between the vectors.

FIG. 6 is a block diagram of an example subsystem 600 for converting or encoding two or more segment signatures, into vectors and then comparing the vectors. In an example embodiment, subsystem 600 may be used to compare a segment signature i 604, which may be a reference signature, to a signature j 606, which may be a test signature. Subsystem 600 generally comprises encoder 601, which in turn may comprise Siamese neural networks 602, which comprises first and second artificial neural networks 608, 610. Networks 608, 610 may be referred to as subnetworks.

To build training data for the training of the encoder, segment signatures may be paired. If the paired signatures have same tag, there are given similarity score of 1. If the tags are different, the similarity score is set to 0. In other words, the training data for the encoder training module comprises paired signatures with similarity scores as labels. Such data is then used to train the encoder such that once trained, the distance between the encoded vectors of the signatures with same tag is smaller than a magnitude.

Each subnetwork 608, 610 generates an encoded vector representation 612, 614 of its respective signatures 604, 606. A distance between the two encoded vector representations 612, 614 may then be calculated. The value may be passed through a sigmoid function 618, which outputs a probability between 0 and 1. The probability corresponds to a similarity score 620 of the two signatures. Similar signatures preferably have a similarity score close to 1, while dissimilar signatures preferably have a similarity score close to 0. One or more predefined thresholds may be used to assess whether a score is sufficiently "close" to 0 or 1. In other embodiments, the distance value between the two encoded vector representations may not be put through a sigmoid function. Other ways of assessing whether the distance value indicates that the signatures are similar or dissimilar may be used. For example, one or more predefined thresholds may be used to assess whether two signatures, or other data records, are sufficiently "similar" based on a comparison of their respective vector representations. If the distance is lower than a threshold, then the two signatures may be deemed similar; if the distance is higher, the signatures may deemed dissimilar.

When signature pair 604, 606 having the same tag are selected, it is known that the signatures (e.g. feature data) also have similar label values since they were assigned to the same bin based on the similar label values. Accordingly, signature pair 604, 606 will ideally produce a similarity score close to 1. Similarly, when signature pair 604, 606 are known to have dissimilar signatures, they will ideally produce a similarly score of close to 0. The encoder may be trained using the training data to develop a function that produces the above described functionality.

Although the example of FIG. 6 is based on Siamese neural networks, it is to be appreciated that in other embodiments, the encoders and/or comparing of data records, such as segment signatures, may employ any other suitable encoding and/or comparing techniques, separately or in combination, in the one-shot learning literature such as Bayesian one shot learning and/or one-shot learning of simple visual concepts.

Once the encoder has been trained, it may be provided to encoder module 126 for use.

One of the challenges facing fleet operators during the process of electrifying their fleet is the absence of sufficient data associated with EVs, whereas ICEV or hybrid vehicle data from historical databases may be in abundance. As such, it is difficult or impractical to provide a data-driven approach to controlling the fleet with the lack of data on EVs.

According to an aspect of the present disclosure, one or more labels associated with travel over a road segment by a vehicle of a fleet, for example an EV, may be estimated with little or no data available from that fleet for such a given road segment. A standardized representation of journey characteristics in the form of a segment signature as well as standardized set of labels associated with each signature provides a solution by leveraging data from a third party use-case fleet for use with another use-case fleet. Further, it is contemplated that the teachings of the present disclosure may be used in applications other than vehicle fleet management.

An encoder has been described, which may be used to compare and/or evaluate the similarities between two distinct signatures. In an embodiment, in order to identify whether an encoder(s) currently in use and trained with data from a third party (previously operated) fleet operator, or other third parties, is suitable to be used with the new use-case fleet system 190, a fitness analysis may be performed. This analysis may be done by a fitness analysis module 122 in center subsystem 110 shown in FIG. 1. A trained encoder may be suitable for use with the new use-case fleet system 190 if the encoder generates vector representations of two signatures from the new use-case, that are already known to be similar (having assigned same tags) based on their labels, such that the generated vectors are similar enough that their comparison results in a determination that the signatures are similar. In other words, the encoder consistently generates similar vectors for similar signatures from the new use-case data. On the other hand, an encoder that was previously trained on third party data may be deemed to be unsuitable for use with the new use-case fleet system 190 if the encoder does not reliably generate similar vectors for similar signatures from the new use-case data. Whether or not an encoder is deemed to be suitable or not may be determined based on one or more factors, such as thresholds, as described below.

In fitness analysis module 122, signatures generated from historical data from the new use-case fleet system 190 being on-boarded may be compared to one another using the trained encoder. For each comparison, two signatures selected and paired. In an embodiment, the signatures used for the fitness analysis may comprise signatures based on EV data, ICEV data, or both. In an embodiment, the signatures used for the fitness analysis may not include any signatures based on EV data. The similarity scores associated with each pair is calculated using the encoder and a percentage of correctly identified similarity scores are recorded. Correctly identified similarity scores are defined as close to 1, while correctly identified dissimilar signatures should have a similarity score close to 0. Again, one or more predefined thresholds may be used to assess whether a similarity score is correct or incorrect. As a mere example, a threshold of 0.8 may be used such that similarity scores of 0.8 and above are considered to correspond to paired signatures having identical tags. Similarity scores of 0.2 and below may be considered to correspond to paired signatures having nonidentical tags.

If the percentage of the correctly identified similarity scores by the currently trained encoder are smaller than a user-defined threshold, this may indicate that the currently trained encoder is not suitable for use with the new use-case fleet system 190. In such a case, the encoder may be retrained with inclusion of data from the new use-case fleet system 190. Conversely, if the percentage of the correctly identified similarity scores are equal to or larger than the user-defined threshold, the currently trained encoder may be used in the selection of a subset of signatures from the global signature repository to construct a vehicle fleet specific signature repository.

In embodiments or scenarios when multiple labels, and hence multiple encoders, are being used, a fitness analysis module may use only one of the encoders in the fitness analysis. However, if model re-training determined to be necessary or desired, all encoders should be re-trained using data from the new use-case fleet system 190.

Making reference again back to FIG. 1, system 100 may comprise a vehicle fleet specific signature repository database 124. A notion here is to select a subset of the signatures from the global signature repository 118, which may contain a portion, a majority, or a totality of signatures that are based on vehicle related data that originates from outside of the present use-case vehicle fleet system 190. The selected subset will contain signatures that are determined or estimated to be suitable for use with the present use-case vehicle fleet system 190. This subset may be referred to as a customized dataset.

For example, global signature repository 118 may contain a large number of signatures from a wide variety of vehicle types and road conditions. However, perhaps only a subset of these signatures are somewhat similar to signatures generated based on data from the present use-case vehicle fleet system 190. For instance, signatures based on data from a tractor trailer fleet operating on relatively flat terrain may be of little or no use to a use-case fleet composed of mostly small electric vehicles operating in mountainous terrain.

In other embodiments, the subset of vehicle fleet specific signatures may be represented in any other suitable manner, meaning not necessarily stored in vehicle fleet repository 124. In an embodiment, copies of at least some of the signatures in the subset from the global signature repository 118 may be stored in repository 124. In an embodiment, entries in a list, links, references, or pointers to at least some the signatures in the subset from the global signature repository 118 may be stored in repository 124. Other options are also contemplated.

Figure 7:
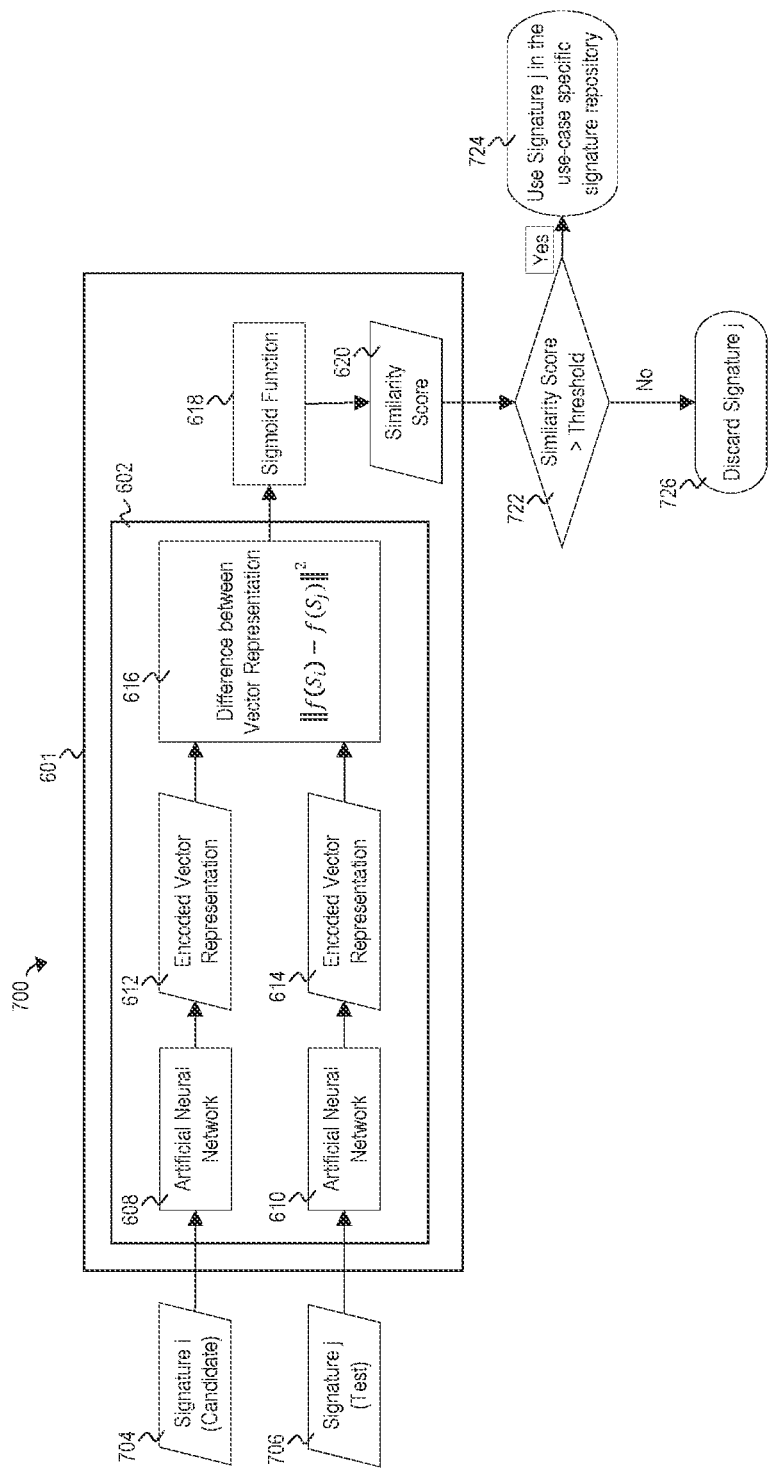
FIG. 7 is a block diagram of an example subsystem similar to the one of FIG. 6 with additional blocks relating to assessing whether a candidate segment signature gets added to a use-case specific segment signature repository.

A vehicle fleet specific signature repository database 124 may be generated as follows. FIG. 7 is a block diagram of an example subsystem 700 similar to the one of FIG. 6 but including additional blocks relating to assessing whether a candidate signature gets added to a use-case specific signature repository.

One or more test signatures may be generated from historical data of the new use-case fleet system 190. For instance, one or more test signatures associated with an EV in a route segment are constructed from the new use-case fleet system 190 using, for example, a limited number of available EV journeys in the new use-case or, in absence of such EV data, from ICEV data by replacing the vehicle attributes with attributes from the EV. In an embodiment, the test signature need not have any label value or data.

Further, a candidate signature may be selected or otherwise obtained from the global signature repository 118. Then, the test signature 706 from the new use-case fleet system 190 and the candidate signature 704 from the global signature repository 118 may then both be encoded into vector representations by encoder 126, namely a test vector and a candidate vector. A level of similarity between the test vector and the candidate vector may then be determined. For example, the vectors may then be compared to assess whether they are similar. In an embodiment, a similarity score may be generated, based on the comparing, indicative of the similarity between the candidate vector and the test vector. A similarity score may be any value, parameter, or other result indicative of the similarity between the two vectors. The candidate signature may be added to the vehicle fleet specific signature repository database 124 if the test and candidate vectors are determined to be sufficiently similar, for example if the level of similarity between them (e.g. a similarity score) exceeds a predetermined threshold. Thus, referring to the example embodiment of FIG. 7, a similarity score may be compared to a threshold value 722. If the similarity score exceeds the threshold, the candidate signature may be added 724 to the specific segment signature repository 124. Conversely, if the similarity score is lower than (or equal to) the threshold, the candidate signature may be discarded 726.

In an embodiment, the level of similarity comprises a similarity value, which may be the distance between the two vectors, and the similarity value may be passed through a sigmoid function to generate a similarity score. The candidate record may be added to the repository 124 if the similarity score exceeds a predetermined threshold score. In an embodiment, the encoding and/or the determining a level of similarity involves the use of an encoder module comprising a Siamese neural network.

This process of comparing a candidate signature to a test signature and adding the candidate signature to the vehicle fleet specific signature repository database 124 may be repeated using a plurality of different candidate records from the global signature repository 118 to populate the vehicle fleet specific signature repository database 124 with a plurality of candidate signatures.

Referring again to FIG. 1, center subsystem 110 may also comprise a predictor(s) training module 128 and/or an optimizer(s) training module 130.

Predictor training module 128 may be responsible for training one or more predictor(s), such as predictor(s) for predictor module 168 in edge subsystem 160, for example for estimating one or more label values for new signatures generated from streaming data of the use-case vehicle fleet system 190. The estimations may be performed by a predictor that has been trained on third party EV data. Input(s) to optimizer module 170 in edge subsystem 160 may comprise and/or be based on the estimated label values generated by predictor module 168. Developing and training a predictor may be done in any suitable way(s), including those generally known in the art. In general, in an embodiment, the predictor training module may use any suitable supervised machine learning/deep learning technique, such as for example Multi-layer perceptron, decision-trees, to name but a few, that receives labeled historical data and trains a model(s) to estimate the label(s) of the data.

In an example, a new segment signature is generated from streaming data from fleet system 190, where the data relates to a segment to be traveled by an EV. A label field of the signature may be electric energy consumption, corresponding to the amount of electric energy that would likely be used by the EV to travel the segment of the journey. The trained predictor may estimate a label value for the electric energy consumption label field.

In another example, a new segment signature is generated from streaming data from fleet system 190, where the data relates to a segment traveled by an EV. An electric energy consumption label field of the signature may be populated with a label value corresponding to the actual amount of electric energy used by the EV to travel the segment of the journey. However, a fuel consumption label field of the signature may be unpopulated since the EV did not consume any fuel such as gasoline or diesel. The trained predictor may estimate a label value for the fuel consumption label field of the signature.

The predictor may be a machine learning based predictor. Further, the predictor may be trained using data from the vehicle fleet specific signature repository 124, which comprises segment signatures based on third party data. Again, if the third party data contains sufficient amounts of both ICEV and EV data, then vehicle fleet system 190 may leverage this data to estimate useful data values in relation to its controllable assets, such as EVs in its fleet, when system 190 has little to no historical EV data of its own.

Further, a predictor may be trained using data that comprises at least some historical data 104, 106, 108, 109.

In an embodiment, the predictor may receive as input data from signatures from vehicle fleet specific signature repository 124. In an embodiment, the predictor may be configured to receive and operate on vector representations of data from signatures from vehicle fleet specific signature repository 124 that were generated by encoder module 126. In such cases, similarly, the predictor may have been trained with vector representations of data from signatures from vehicle fleet specific signature repository 124. In an embodiment, in scenarios when the predictor uses vector representations of the signatures, the predictor may be retrained each time the encoder is retrained.

Optimizer training module 130 may be responsible for training one or more optimizers(s), such as optimizers(s) for optimizer module 170 in edge subsystem 160, for example for solving an optimization problem(s) for controlling the use-case vehicle fleet system 190. The predictor(s) may be machine learning based predictors. The optimizer(s) may be trained using data from the vehicle fleet specific signature repository 124, streaming data from the fleet system 190, and/or at least some historical data 104, 106, 108, 109. Controlling the vehicle fleet system 190 may involve dictating actions for one or more controllable assets, for example vehicles 192, in fleet system 190.

Once the encoder(s), predictor(s), and/or optimizer(s) have been trained in central subsystem 110, they may be communicated to, or otherwise made available to, edge subsystem 160. Further, trained predictor(s) may be communicated to, or otherwise made available to optimizer training module 130. Moreover, info and data in vehicle fleet specific signature repository 124 may be transmitted, or otherwise made available, to modules in edge subsystem 160.

Optimizer training module 130 and the trained optimizer(s) may require the one or more labels that were estimated by the predictor(s). An example is when an optimizer decides to assign EVs to routes. The optimizer may need to estimate in real-time the energy consumption of a vehicle(s) associated with each route. The information may be provided by the trained predictor.

Modules and operations of edge subsystem 160 are now described with reference to FIG. 1. Edge subsystem 160 may generally comprise at least one or more of a data processing module 162, feature engineering module 164, encoder module 166, predictor(s) module 168, and optimizer module 170. Edge subsystem 160 is adapted to receive data from the vehicle fleet system 190, such as streaming data 102, and possibly from other sources. Edge subsystem 160 may also receive information from fleet system 190, such as status information of various controllable assets such as vehicles 192 in system 190.

Data processor module 162 and feature engineering module 164 may generally be similar in function to data processor module 112 and feature engineering module 114, respectively, of center subsystem 110 except that they are configured to operate on streaming data 102 from vehicle fleet system 190. As such, data processor module 162 may perform operations on data received by edge subsystem 160, such as streaming fleet data 102. Information outputted from data processor module 162 may be provided to feature engineering module 164 and/or optimizer module 170 and/or center subsystem 110. Data processor module 162 may also be configured to provide optimizer module 170 with the information if needs to perform the optimizing.

Feature engineering module 164 may, for example, segment a journey received in streaming fleet data 102 into one or more segments, and then generate new segment signatures of each of the segments. Module 164 may also estimate label values for new signatures that have one or more label fields that are not populated, for example using a data labelling module similar to module 422 of FIG. 4. In an embodiment, a difference between feature engineering module 116 in center subsystem 110 and feature engineering module 164 in edge subsystem 160 is that feature engineering module 164 does not have or use a data labelling module 422 shown in FIG. 4 for generating label values. Rather, at edge subsystem 160, for signatures generated from streaming data of the present use-case fleet, label values are estimated by predictor(s) at predictor module 168.

New signatures generated by feature engineering module 164 may be communicated to encoder module 166 to be encoded into vectors and/or communicated to predictor module 168 without undergoing encoding, depending on the particular embodiment. Encoded vector representations of new signatures may be communicated to predictor module 168. Encoder module 166 may comprise one or more trained encoders 126 received from center subsystem 110. In an embodiment where system 100 is configured to use multiple labels, encoder module 166 may include an encoder for each label.

Predictor module 168 may comprise one or more trained predictors received from center subsystem 110. Again, a predictor at predictor module 168 may be used to estimate a label value(s) for new signatures generated by feature engineering module 164 from streaming data 130 of the present use-case fleet. In an embodiment, the newly generated signatures from feature engineering module 164 do not have label values. Predictor module 168 is used to generate these label values. In an embodiment where system 100 is configured to use multiple labels, predictor module 168 may include a predictor for each label. Estimated label values for new signatures may be communicated to optimizer module 130.

In embodiments, predictor training module 128 and predictor(s) 168 have either signatures, or their encoded vector representations, as input since the predictor(s) is trained with data that is not necessarily from the present use-case fleet, but rather comprises third party data. The predictor estimates a label value(s) for signatures of the present use-case fleet, where, for example, there may be few or no other existing signatures. The predictor(s) may be implemented using or based on any suitable type of machine learning model(s).

Optimizer module 130 comprises one or more trained machine learning optimizers, which may be configured to solve a control optimization problem(s) related to vehicle fleet system 190, for example by either minimizing a cost function or maximizing a reward function. Once an optimal value(s) of a decision variable is determined, vehicle fleet system 190 may be controlled based on the optimal value(s), for example by indicating actions to the controllable asset(s) in system 190. In an embodiment, the optimization objective(s) corresponds to the label(s) used in system 100. For instance, if an optimization is to minimize electric energy consumption of vehicles, system 100 may be configured to have a corresponding label field in each of the segment signatures.

Mere example of optimization parameters may include or be related to one or more of electric energy consumption of vehicles, fuel consumption of vehicles, and electric charging related parameters of electric assets (e.g. EVs). Optimizing the charging of electric assets may relate to, for example, minimizing charging cost, maximizing charging efficiency, increasing use of certain types of energy such as locally generated renewable energy, etc.

Inputs to the optimizer(s) include streaming vehicle fleet data 102, which may have been processed by data processor module 162, estimated label values of new signatures generated by predictor module 168 from streaming vehicle fleet data 102, and/or status related information from vehicle fleet system 190, for example status information relating to controllable assets in system 190 such as vehicles 192. Vehicle fleet data 102 may include any type of suitable data, including data relating to controllable assets in vehicle fleet system 190.

Status information relating to controllable assets may include any type of information. Mere examples include one or more of charge levels of EVs, required charge times of vehicles, battery capacities, charging rates, fuel capacities, fuel tank fill levels, actual or scheduled times of arrival, actual or scheduled times of departure, charging duration, idle duration, charging power, other meta data such as vehicle ID, driver ID, time on road, distance traveled, schedule travel distance, or distance range.

In an embodiment, as new data relating to journeys traveled by vehicles in the new use-case fleet system 190 is generated, new signatures may be created using this new data, and at least some of the new signatures may be added the repository 124. In an embodiment, at least some signatures in specific signature repository 124 that are based on third party data may be removed from repository, for example as the new signatures are added. In this way, a proportion of the signatures from third party data or use-cases in vehicle fleet specific signature repository 124 may be gradually displaced and replaced by signatures generated from data of the new use-case fleet system 190.

Further, encoder(s) and/or predictor(s) of system 100, such as encoder(s) 126, 166, or predictor(s) 168, may be retrained at any suitable time(s). For example, the encoder(s) may be retrained in response to a fitness analysis assessment, which may be performed at any time including periodically, that determines that the encore is no longer suitable, or is less suitable, for use with the use-case fleet system 190. As time goes on and vehicle fleet specific signature repository 124 gets updated with new signatures based on EV data of the use-case fleet system 190, the suitability of the encoder(s) may gradually diminish. Further, encoder(s) may be retrained at any suitable time regardless of any fitness assessment. Predictor(s) may be retained at or around the same time as the encoder(s). After retraining, encoder(s) and/or predictor(s) may be communicated or otherwise made available to edge subsystem 160, as appropriate.

Furthermore, as the use-case fleet system 190 continues to operate EVs and gather additional data during the course of operations, use-case specific AI-based predictors and optimizers may become more and more independent of global signature repository 118. At the same time, the collection new data may contribute data for the training of encoders and/or labeling of the signatures with missing labels in order to assist subsequent on-boarding of mixed-fleets with limited EV data.

A representation of a journey over a route in the form of a superposition of signatures may facilitate one or both of real-time route optimization as well as optimized planning during the dispatch of vehicles to routes. Various example scenarios are now described. In these examples, the optimization objective is to minimize electric energy consumption and fuel consumption of a mixed fleet having both EVs and ICEVs. The consumption parameters may therefore be labels in the system.

In a first example, the optimizer is configured to find an optimized vehicle assignment for a predefined set of routes. One of the decision variables is which vehicle to assign to a particular predetermined route. Such a scenario is relevant to a bus fleet, for example. First, the electric energy consumption and the fuel consumption associated with each route is estimated. A bus route may be considered a journey, the journey may be segmented into segments, and signatures may be generated for each segment, for example using the feature engineering module 164. Further, label values of energy consumption and the fuel consumption are estimated, for instance by predictor module 168. Overall electric energy consumption and the fuel consumption for a route may be calculated by summing the label values for each label for all of the signatures that make up the route. Then, these overall values may be provided to optimizer. Streaming data 102 and/or status information from vehicle fleet system 190 may also be provided to optimizer. Optimizer solves the optimization problem to enable an optimized assignment of specific vehicles to specific routes to minimize electric energy consumption and fuel consumption.

In a second example, the optimizer is configured to find optimized route planning and vehicle assignment during vehicle dispatch. The routes are not determined but the destinations are. This scenario may be applicable to a delivery truck fleet, for example. First, possible routes from a source to a destination are identified. Again, a route may be considered a journey, the journey may be segmented into segments, and signatures may be generated for each segment. Further, label values of energy consumption and the fuel consumption are estimated, for instance by predictor module 168. Overall electric energy consumption and the fuel consumption for a route may be calculated by summing the label values for each label for all of the signatures that make up the route. The overall values of electric energy consumption and fuel consumption of each route are fed to an optimizer that optimally selects routes and maps vehicles to each route in order to minimize the aforementioned objective function.

In a third example, the optimizer is configured to find optimized route planning after vehicle assignment and dispatch. Once vehicles are dispatched to routes, each journey may be independently optimized in real time to minimize fuel/energy consumption. This scenario may be applicable in situations where route alteration is allowed during travel. At various instances in time during travel, various possible routes from the current point in the journey to the destination are decomposed into segments and represented via signatures. Signature labels, energy or fuel consumption in this example depending on the type of vehicle, are estimated using a trained predictor. The route may be altered if a better route is identified, meaning a route that reduces the estimated energy or fuel consumption for the rest of the route.

Figure 8:
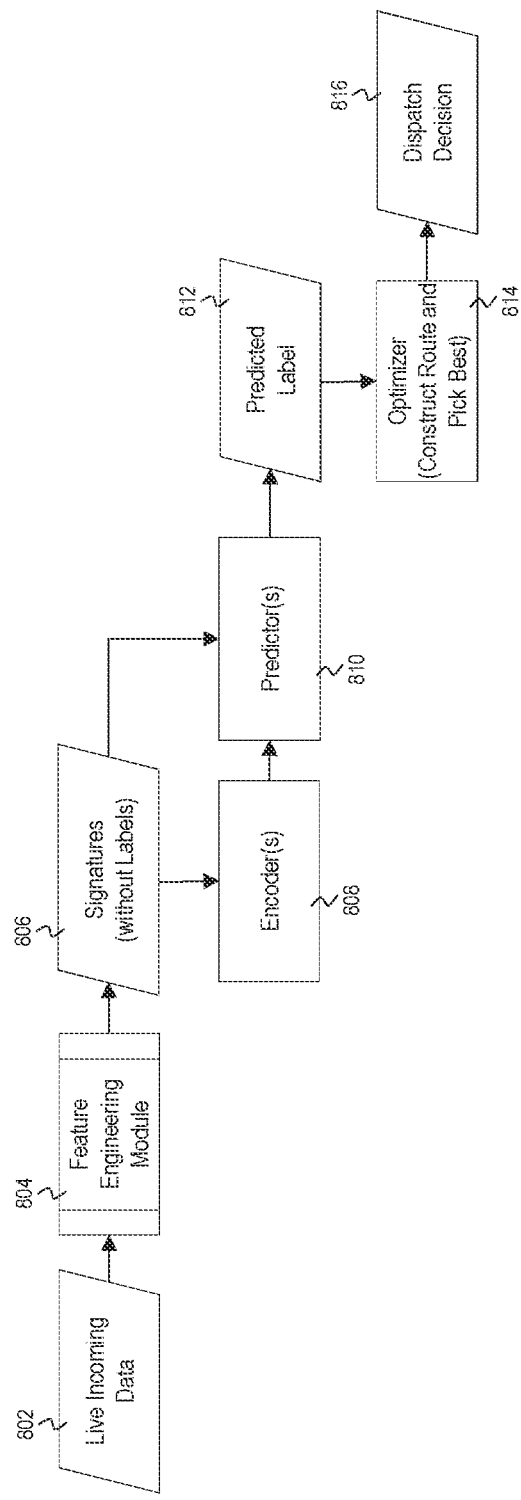
FIG. 8 is a block diagram of an example application involving dynamic in-journey rerouting of a vehicle.

FIG. 8 is an example block diagram corresponding to this third example. Streaming data 802 from a vehicle fleet, which may comprise a remaining portion of a route for a given vehicle, may be provided to feature engineering module 804. Segment signatures 806 are generated for each segment of the remaining portion of the route. Each signature may optionally be encoded via encoder 808 into a vector, and the vectors may be provided to predictor module 810. Predictor module 810 may estimate a signature label 812, energy or fuel consumption in this example depending on the type of vehicle, for each signature. The estimated label for each segment may then be provided to optimizer 814, which solves the optimization problem to minimize electric energy consumption and fuel consumption. If a different remaining route is discovered that reduces the estimated energy or fuel consumption, the planned route of the vehicle may be changed to this new route via a revised dispatch decision 816.

The teachings according to the present disclosure contemplate and include methods, systems, and techniques that use and are based on data records more generally, as opposed to segment signatures specifically. In an embodiment, a record may comprise data relating to a journey traveled by a vehicle. However, in other embodiments, the records may additionally or alternatively include information/data other than data relating to a journey traveled by a vehicle. Accordingly, embodiments include embodiments similar to those described and otherwise contemplated herein, in which segment signatures are replaced with data records, which again are not necessarily limited to the structure and/or content of segment signatures.

Figure 9A:
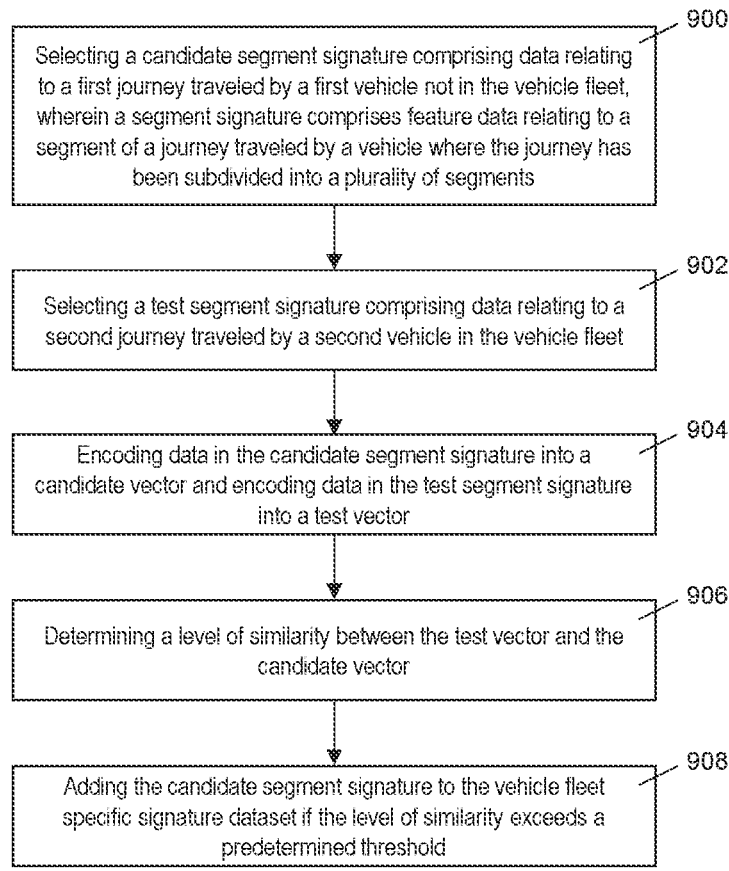
FIG. 9A is a process flow diagram of an example method.

FIG. 9A is a process flow diagram showing operations or steps of an example computer-implemented method according to an example embodiment. The method may be implemented using one or more electronic devices each having one or more processors and memory. According to the method, a vehicle fleet specific signature dataset may be generated for use with a vehicle fleet.

At block 900, a candidate segment signature is selected comprising data relating to a first journey traveled by a first vehicle not in the vehicle fleet. A segment signature comprises feature data relating to a segment of a journey traveled by a vehicle where the journey has been subdivided into a plurality of segments.

At block 902, a test segment signature is selected comprising data relating to a second journey traveled by a second vehicle in the vehicle fleet.

At block 904, data in the candidate segment signature is encoded into a candidate vector and data in the test segment signature is encoded into a test vector.

At block 906, a level of similarity is determined between the test vector and the candidate vector.

At block 908, the candidate segment signature is added to the vehicle fleet specific signature dataset if the level of similarity exceeds a predetermined threshold.

In an embodiment, the method further comprises training a data-driven predictor using data from the vehicle fleet specific signature dataset, the predictor for estimating data values for use in controlling the vehicle fleet. In an embodiment, the second vehicle is an electric vehicle.

In an embodiment, the determining a level of similarity comprises calculating a distance between the test vector and the candidate vector. The distance may be passed through a sigmoid function to generate a similarity score. The candidate segment signature may be added to the vehicle fleet specific signature dataset if the similarity score exceeds a predetermined threshold. In an embodiment, the encoding and the determining a level of similarity involve the use of a Siamese neural network. In an embodiment, as new segment signatures relating to journeys traveled by vehicles in the vehicle fleet are created, at least some of the new segment signatures may be added to the vehicle fleet specific signature dataset. In an embodiment, the feature data of segment signatures comprises information relating to one or more of: a characteristic of a type of the vehicle that traveled the journey segment, to a characteristic of road conditions of the journey segment, and/or to a characteristic of driver inputs to the vehicle during the journey segment. In an embodiment, a data-driven artificial intelligence system may be trained for controlling the vehicle fleet using data from the customized dataset.

Figure 9B:
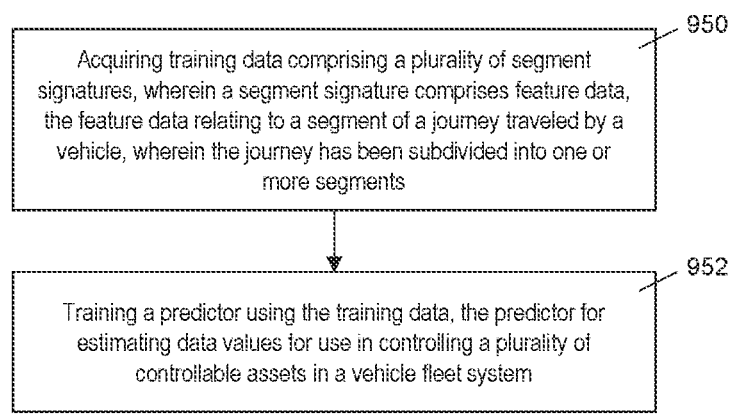
FIG. 9B is a process flow diagram of an example method.

FIG. 9B is a process flow diagram showing operations or steps of an example computer-implemented method according to an example embodiment. The method may be implemented using one or more electronic devices each having one or more processors and memory.

At block 950, training data may be acquired comprising a plurality of segment signatures, wherein a segment signature comprises feature data, the feature data relating to a segment of a journey traveled by a vehicle, wherein the journey has been subdivided into one or more segments.

At block 952, a predictor may be trained using the training data, the predictor for estimating data values for use in controlling a plurality of controllable assets in a vehicle fleet system.

In an embodiment, the method comprises, prior to the acquiring, generating one or more of the plurality of segment signatures. The one or more of the plurality of segment signatures may relate to a journey previously traveled by a vehicle not in the vehicle fleet system.

In an embodiment, the method comprises controlling, using the controller, the plurality of controllable assets in the vehicle fleet system. The controlling may comprise receiving new journey information associated with the vehicle fleet system, the new journey information relating to a new journey to be traveled. The new journey may be subdivided into at least one new journey segment, and for each of the at least one new journey segment, a new segment signature may be generated. A label may be assigned to the new segment signature, the label based on the feature data of the new segment signature. The controlling the plurality of controllable assets in the vehicle fleet system may be based on the label assigned to the new journey segment.

In an embodiment, the assigning a label to a new segment signature comprises estimating the label using a predictor that has been trained using historical data from the vehicle fleet system.

In an embodiment, controlling the plurality of controllable assets comprises solving an optimization problem, and wherein assigned labels of segment signatures are inputs to the optimization problem.

In an embodiment, the method further comprises dynamic route reselection once a vehicle is already partially completed the route. In particular, the method further comprises controlling, using the controller, a vehicle in the vehicle fleet system by identifying a remaining portion of a route of the vehicle after the vehicle has already started on the route. The remaining portion is between a location of the vehicle on the route and a destination of the route. One or more possible journeys may be identified from the location of the vehicle to the destination. Each of the one or more possible journeys may be subdivided into at least one new journey segment. For each of the at least one new journey segment, a new segment signature may be generated comprising a label. One of the one or more possible journeys may be selected based on the labels of the at least one new journey segments.

In an embodiment, the feature data of segment signatures comprises information relating to one or more of: a characteristic of a type of the vehicle that traveled the journey segment, to a characteristic of road conditions of the journey segment, and/or to a characteristic of driver inputs to the vehicle during the journey segment.

Figure 10:
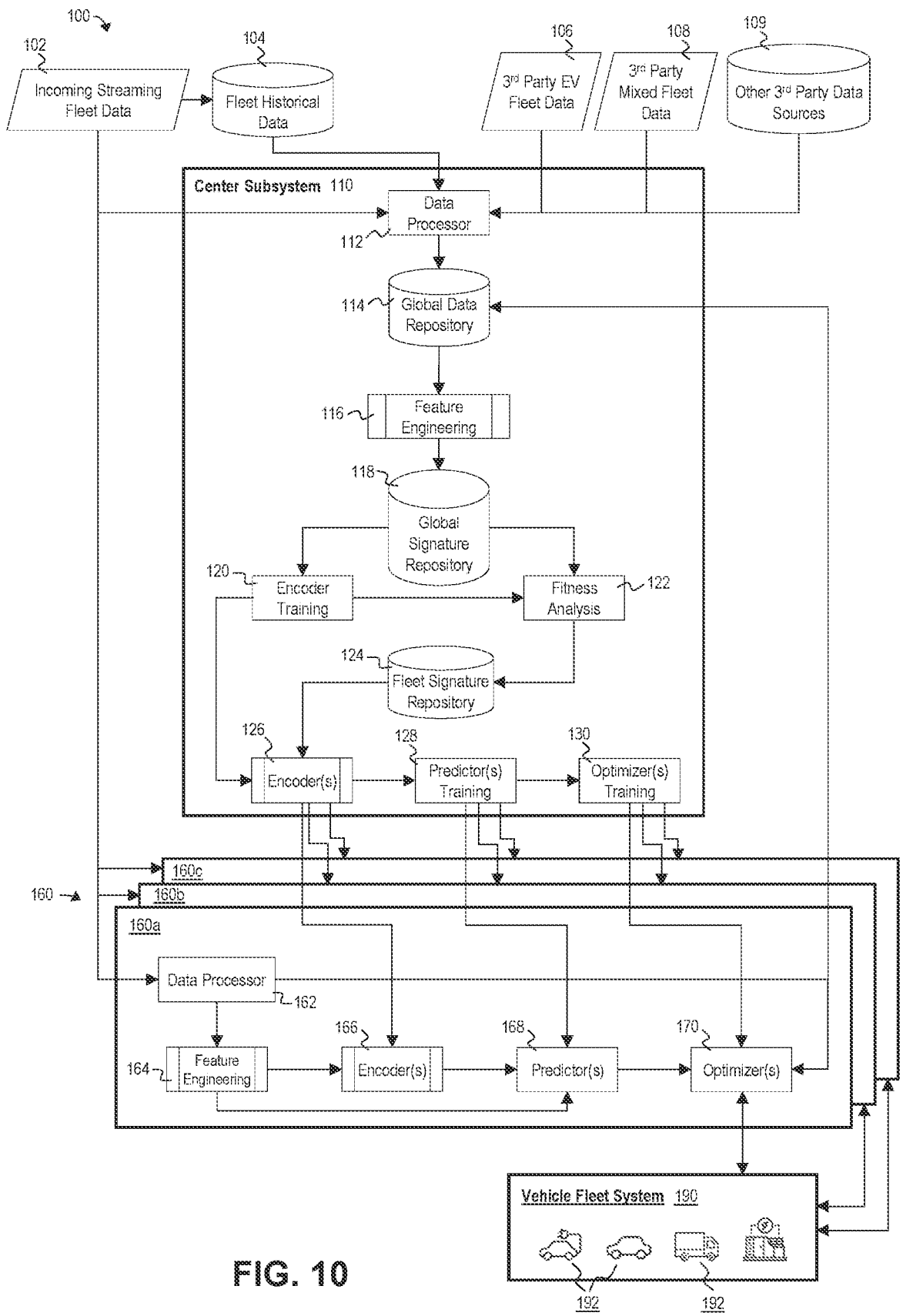
FIG. 10 is a block diagram of an example system similar the one FIG. 1 with a plurality of edge modules.

FIG. 10 is a block diagram of an example system 1000 similar to system 100 of FIG. 1, however here edge subsystem 160 comprises a plurality of edge modules 160*a*, 160*b*, 160*c*. In this example, there are 3 edge modules, but this is not limiting in any way. Each edge module may comprise one or more of: data processor modules 162, feature engineering modules 164, encoder modules 166, predictor modules 168, and/or optimizer modules 170. Each edge module may communicate with center subsystem 110 and/or vehicle fleet system 190, and may receive data from one or more other sources, such as one or more of sources 102, 104, 106, 108, 109, as indicated by the various arrows interconnecting the boxes. Further, an edge module may communicate with one or more of the other edge modules in the edge subsystem 160.

In an embodiment, one or more of the edge modules may be a primary control edge module(s) for controlling vehicle fleet system 190, meaning this edge module may exercise some central or overall control relative to the other edge module(s). This module may be referred to as a control edge module. In the embodiment of FIG. 10, the control module may be edge module 160*a*. Output(s) of other edge modules may be provided to the control edge module for use as inputs for controlling vehicle fleet system 190.

Edge module(s), such as control edge module 160*a*, may comprise, for example, one or more electronic or other computer processors, computer memories, computer storage devices for storing one or more databases 112, as well as other computer hardware. Each of the other predictor edge modules 160*b*-*d* may be software modules, or may comprise both computer software and hardware. One or more edge modules 160*a*-*d* may be located remotely from center subsystem 100, and/or remotely from other edge modules.

Other edge module(s) may comprise a predictor module(s), which may be used to estimate parameters that may be used in relation to solving the control or optimization problem. These modules may be referred to as a predictor edge modules. Some example estimation parameters are signature label values (for example similar to predictor module 168 in FIG. 1), weather, energy prices, energy demand, etc. The predictors may comprise trained machine learning systems for estimating their respective parameters, or may comprise any other suitable estimation technique.

Similarly, one or more other edge modules may comprise one or more optimizers for solving any optimization problem related to the overall control of vehicle fleet system 190. The optimizer(s) may comprise trained machine learning systems for optimizing one or more target optimization parameters, or may comprise or implement any other optimization technique.

Further, as noted above, edge modules may comprise any suitable combination of various types of modules.

Figure 10A:
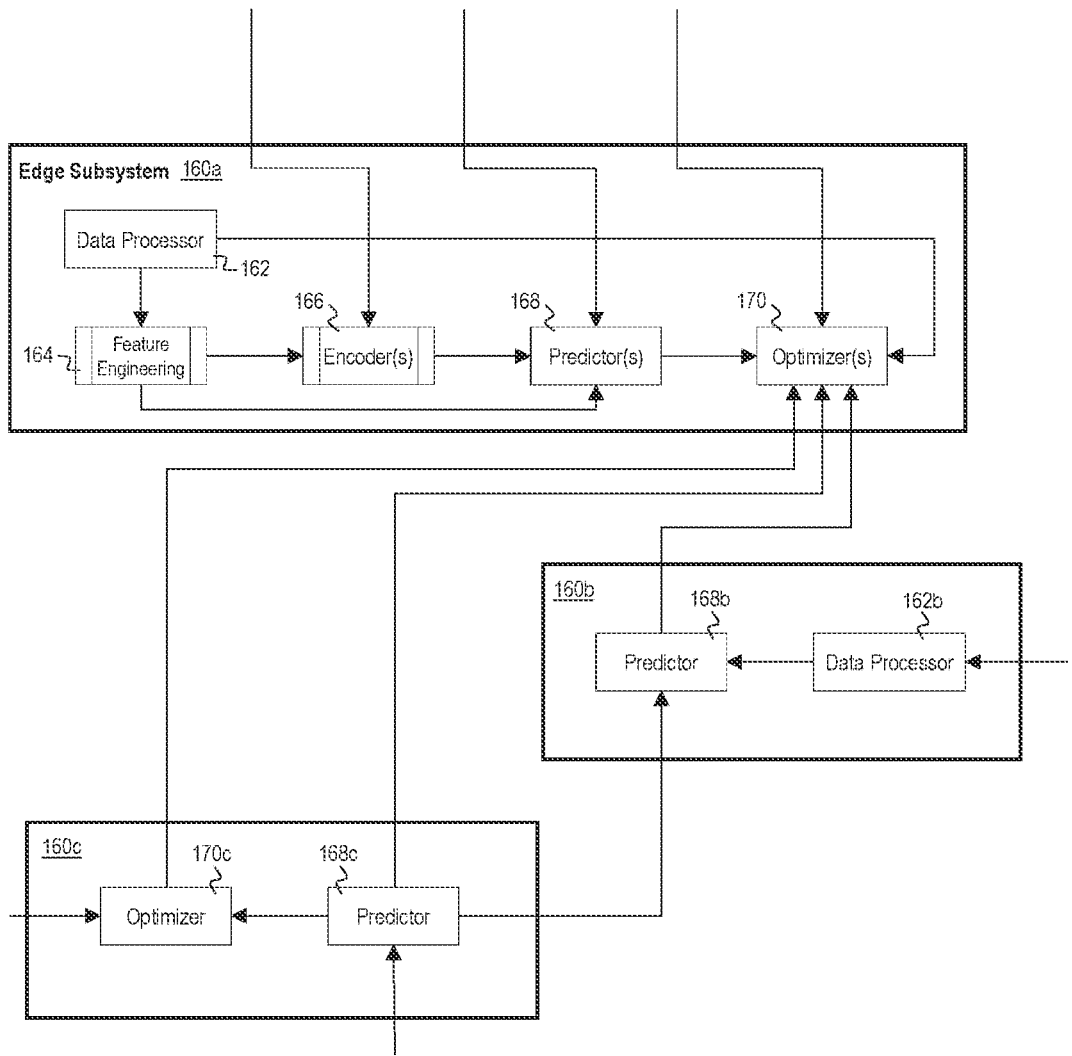
FIG. 10A is a block diagram showing the plurality of example edge modules of FIG. 10 in more detail.

FIG. 10A is a block diagram showing an example edge subsystem 160 of FIG. 1 in more detail. The components and interconnections of edge modules 160*a*, 160*b*, 160*c* are merely examples to illustrate some example ways that components or modules of various edge modules may communicate, cooperate, and receive outputs and provide inputs to one another. Edge module 160*c* comprises predictor 168*c* that receives some input. Output of predictor 168*c* is provided as an input to optimizer 170*c*, as an input to optimizer 170 of edge module 160*a*, and as an input to predictor 168*b* of edge module 160*b*. Thus, for instance, an output of one predictor may be used as an input to another predictor. Optimizer 170*c* receives input and provides its output to as an input to optimizer 170 of edge module 160*a*. Data processor 162*b* of edge module 160*b* receives input and provides its output to predictor module 168*b*. Predictor module 168*b* receives input and provides its output to optimizer 170 of edge module 160*a*.

It is to be appreciated that, in other embodiments, the number of edge modules may be higher or lower, and/or the functions, operations, and/or structures of the edge modules may be allocated and configured differently from those shown and described herein.

Embodiments and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor. Operations according to the present disclosure may be implemented as operations performed by one or more processing devices on data stored on one or more computer-readable storage devices or media, and/or received from other sources.

Figure 11:
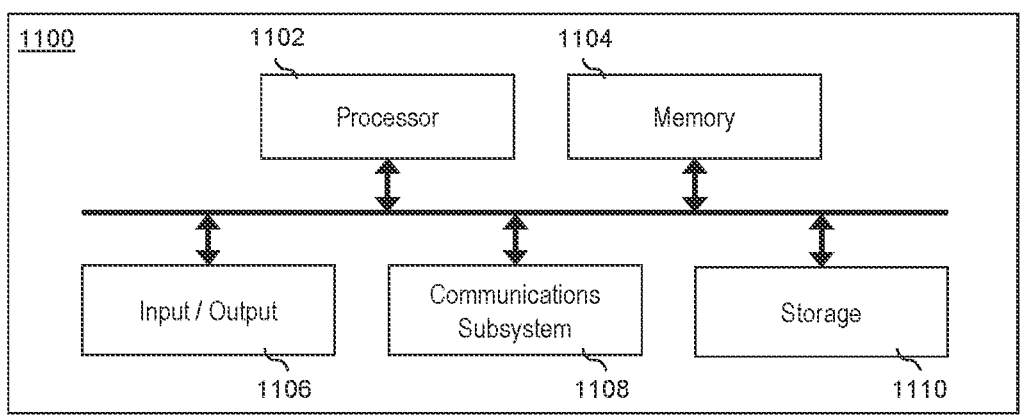
FIG. 11 is a block diagram of an example computerized device or system

FIG. 11 is a block diagram of an example computerized device or system 1100 that may be used in implementing one or more aspects or components of an embodiment according to the present disclosure. For example, system 1100 may be used to implement a computing device or system, such as a controller, to be used with a device, system or method according to the present disclosure. Thus, one or more systems 1100 may be configured to implement one or more portions of system 100 or system 100 in its entirety. This includes center subsystem 110 and/or edge subsystem 160.

Computerized system 1100 may include one or more of a computer processor 1102, memory 1104, a mass storage device 1110, an input/output (I/O) interface 1106, and a communications subsystem 1108. A computer processor device may be any suitable device(s), and encompasses various devices, systems, and apparatus for processing data and instructions. These include, as examples only, one or more of a programmable processor, a computer, a system on a chip, and special purpose logic circuitry such as an ASIC (application-specific integrated circuit) and/or FPGA (field programmable gate array).

Memory 1104 may be configured to store computer readable instructions, that when executed by processor 1102, cause the performance of operations, including operations in accordance with the present disclosure.

One or more of the components or subsystems of computerized system 1100 may be interconnected by way of one or more buses 1112 or in any other suitable manner.

The bus 1112 may be one or more of any type of several bus architectures including a memory bus, storage bus, memory controller bus, peripheral bus, or the like. The CPU 1102 may comprise any type of electronic data processor. The memory 1104 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1110 may comprise any type of storage device configured to store data, programs, and other information and to make the data, programs, and other information accessible via the bus 1112. In particular, device 1110 may be configured to store repositories/database 104, 114, 118, 124 of system 100. The mass storage device 1110 may comprise one or more of a solid state drive, hard disk drive, a magnetic disk drive, an optical disk drive, or the like. In some embodiments, data, programs, or other information may be stored remotely, for example in the cloud. Computerized system 1100 may send or receive information to the remote storage in any suitable way, including via communications subsystem 1108 over a network or other data communication medium.

The I/O interface 1106 may provide interfaces for enabling wired and/or wireless communications between computerized system 1100 and one or more other devices or systems, such as an electric vehicle charging system according to the present disclosure. Furthermore, additional or fewer interfaces may be utilized. For example, one or more serial interfaces such as Universal Serial Bus (USB) (not shown) may be provided. Further, system 1100 may comprise or be communicatively connectable to a display device, and/or speaker device, a microphone device, an input device such as a keyboard, pointer, mouse, touch screen display or any other type of input device.

Computerized system 1100 may be used to configure, operate, control, monitor, sense, and/or adjust devices, systems, and/or methods according to the present disclosure.

A communications subsystem 1108 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 2008 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1374), Thunderbolt™, WFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 1108 may include one or more ports or other components (not shown) for one or more wired connections. Additionally or alternatively, communication subsystem 1108 may include one or more transmitters, receivers, and/or antenna Further, computerized system 1100 may comprise clients and servers. elements (none of which are shown).

Computerized system 1100 of FIG. 11 is merely an example and is not meant to be limiting. Various embodiments may utilize some or all of the components shown or described. Some embodiments may use other components not shown or described but known to persons skilled in the art.

The concept of "near real-time" may be defined as operating using a pre-determined time interval or less.

Center subsystem 110 and edge subsystem 160 may be implemented on a single computing device, on separate computing devices, or on several computing devices. In an embodiment, center subsystem 110 and edge subsystem 160 may be implemented in a distributed computing system wherein operations are performed at each of two or more computing devices. Other options and configurations are possible.

In other embodiments, the functions, operations, and/or structures of center subsystem 110 and edge subsystem 160 may not be divided as between the two subsystems 110 and 160 as shown and described with reference to FIG. 1. For example, some or all of the functions, operations, and/or structures of edge subsystem 160 may be located or performed at center subsystem 110. Alternatively, some or all of the functions, operations, and/or structures of center subsystem 110 may be located or performed at edge subsystem 160. Alternatively, the system could have only a single subsystem, which has all of the functions, operations, and/or structures of both subsystems 110, 160 described herein. Other configurations are also possible and contemplated.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The above-described embodiments are intended to be examples only. Alterations, modifications and variations may be effected to the particular embodiments by those of skill in the art without departing from the scope, which is defined solely by the claims appended hereto.

The following example clauses describe further aspects according to the present disclosure.

Clause 1. A method comprising:
at one or more electronic devices each having one or more processors and memory:
receiving data relating to a journey that was traveled by a vehicle;
subdividing the journey into one or more journey segments;
generating a segment signature for each of at least one or more of the journey segments, wherein a segment signature comprises feature data and a label, wherein the feature data comprises information relating to the journey segment that was traveled by the vehicle; and
storing the generated segment signature in a signature repository database, wherein the signature repository database stores a plurality of segment signatures.

Clause 2. A non-transitory computer-readable medium having computer-readable instructions stored thereon, the computer-readable instructions executable by at least one processor to cause the performance of operations comprising the operations according to Clause 1.

Clause 3. A system, comprising: one or more processors; and memory storing instructions for execution by the one or more processors, the instructions for operations according to Clause 1.

Clause 4. A method comprising:
at one or more electronic devices each having one or more processors and memory:
assessing a suitability of an encoder trained using data in a first dataset for use with data in a second dataset, wherein the data in the second dataset comprises a plurality of records, wherein a record comprises feature data and at least one label, the assessing comprising:
selecting a first record and a second record from the second dataset;
encoding, using the encoder, the feature data of the first record into a first vector and encoding the feature data of the second record into a second vector;
detecting if the first and second vectors are similar or dissimilar;
determining if the label of the first record is similar or dissimilar to the label of the second record; and
determining that the detecting is correct when the determination on the first and second vectors matches the determination on the labels of the first and second records.

Clause 5. The method of Clause 4,
wherein the assessing is repeated several times using a plurality of different records from the second dataset as first and second records, and
the method further comprising:
tracking a ratio of a number of correct detections relative to a total number of detections; and
determining that the encoder is suitable for use with data in the second dataset when the ratio exceeds a predetermined threshold.

Clause 6. The method of Clause 4 or 5, wherein the data in the first dataset and the data in the second dataset comprises vehicle fleet related information.

Clause 7. A system, comprising: one or more processors; and memory storing instructions for execution by the one or more processors, the instructions for operations according to any one of Clauses 4 to 6.

Clause 8. A non-transitory computer-readable medium having computer-readable instructions stored thereon, the computer-readable instructions executable by at least one processor to cause the performance of operations according to any one of Clauses 4 to 6.

Clause 9. A method comprising:
at one or more electronic devices each having one or more processors and memory: training an encoder configured to encode a segment signature into a vector, wherein the training comprises using data in a training dataset, wherein the data comprises a plurality of segment signatures, wherein a segment signature comprises feature data and at least one label, the training using a one-shot learning technique and comprising:
assigning each segment signature to one of a plurality of bins, wherein segment signatures assigned to a same bin have similar label values;
selecting a first segment signature and a second segment signature from a same bin;
encoding data in the first segment signature into a first vector and encoding data in the second segment signature into a second vector;
generating a signature similarity score by comparing the first vector to the second vector;
adjusting the encoder in response to the similarity score being above or below a predefined threshold thereby incorrectly indicating the first and second vectors are dissimilar.

Clause 10. A system, comprising: one or more processors; and memory storing instructions for execution by the one or more processors, the instructions for operations according to Clause 9.

Clause 11. A non-transitory computer-readable medium having computer-readable instructions stored thereon, the computer-readable instructions executable by at least one processor to cause the performance of operations according to Clause 10.

The invention claimed is:
1. A method comprising:
at one or more electronic devices each having one or more processors and memory:
generating a vehicle fleet specific signature dataset for use with a vehicle fleet, the generating comprising:
selecting a first segment signature as a candidate segment signature comprising data relating to a first journey traveled by a first vehicle not in the vehicle fleet, wherein the candidate segment signature comprises feature data relating to a segment of the first journey where the first journey has been subdivided into a plurality of segments, wherein the feature data comprises information relating to vehicle type of the first vehicle, wherein at least some of the data in the candidate segment signature is not present in the vehicle fleet specific signature dataset;

selecting a second segment signature as a test segment signature comprising data relating to a second journey traveled by a second vehicle in the vehicle fleet, wherein the test segment signature comprises feature data relating to a segment of the second journey where the journey has been subdivided into a plurality of segments, wherein the feature data comprises information relating to vehicle type of the second vehicle;

encoding data in the candidate segment signature into a candidate vector and encoding data in the test segment signature into a test vector, determining a level of similarity between the test vector and the candidate vector, wherein the determining involves a comparison of the information relating to vehicle type of the candidate segment signature with the information relating to vehicle type of the test segment signature;

adding the candidate segment signature to the vehicle fleet specific signature dataset if the level of similarity exceeds a predetermined threshold.

2. The method of claim 1, further comprising training a data-driven predictor using data from the vehicle fleet specific signature dataset, the predictor for estimating data values for use in controlling the vehicle fleet.

3. The method of claim 1, wherein the second vehicle is an electric vehicle.

4. The method of claim 1,
wherein the determining a level of similarity comprises calculating a distance between the test vector and the candidate vector, the method further comprising passing the distance through a sigmoid function to generate a similarity score,
wherein the candidate segment signature is added to the vehicle fleet specific signature dataset if the similarity score exceeds a predetermined threshold.

5. The method of claim 1, wherein the encoding and the determining a level of similarity involve the use of a Siamese neural network.

6. The method of claim 1, further comprising, as new segment signatures relating to journeys traveled by vehicles in the vehicle fleet are created, adding at least some of the new segment signatures to the vehicle fleet specific signature dataset.

7. The method of claim 1, wherein the feature data of segment signatures further comprises information relating to one or more of: a characteristic of road conditions of the journey segment, and/or a characteristic of driver inputs to the vehicle during the journey segment.

8. A system, comprising:
one or more processors; and
memory storing instructions for execution by the one or more processors, the instructions for operations comprising:
generating a vehicle fleet specific signature dataset for use with a vehicle fleet, the generating comprising:
selecting first segment signature as a candidate segment signature comprising data relating to a first journey traveled by a first vehicle not in the vehicle fleet, wherein the candidate segment signature comprises feature data relating to a segment of the first journey traveled by a vehicle where the journey has been subdivided into a plurality of segments, wherein the feature data comprises information relating to vehicle type of the first vehicle, wherein at least some of the data in the candidate segment signature is not present in the vehicle fleet specific signature dataset;

selecting a second segment signature as a test segment signature comprising data relating to a second journey traveled by a second vehicle in the vehicle fleet, wherein the test segment signature comprises feature data relating to a segment of the second journey where the journey has been subdivided into a plurality of segments, wherein the feature data comprises information relating to vehicle type of the second vehicle;

encoding data in the candidate segment signature into a candidate vector and encoding data in the test segment signature into a test vector, determining a level of similarity between the test vector and the candidate vector, wherein the determining involves a comparison of the information relating to vehicle type of the candidate segment signature with the information relating to vehicle type of the test segment signature;

adding the candidate segment signature to the vehicle fleet specific signature dataset if the level of similarity exceeds a predetermined threshold.

9. The system of claim 8, the operations further comprising training a data-driven predictor using data from the vehicle fleet specific signature dataset, the predictor for estimating data values for use in controlling the vehicle fleet.

10. The system of claim 8,
wherein the determining a level of similarity comprises calculating a distance between the test vector and the candidate vector, the method further comprising passing the distance through a sigmoid function to generate a similarity score,
wherein the candidate segment signature is added to the vehicle fleet specific signature dataset if the similarity score exceeds a predetermined threshold.

11. The system of claim 8, wherein the encoding and the determining a level of similarity involve the use of a Siamese neural network.

12. The system of claim 8, the operations further comprising: as new segment signatures relating to journeys traveled by vehicles in the vehicle fleet are created, adding at least some of the new segment signatures to the vehicle fleet specific signature dataset.

13. The system of claim 8, wherein the feature data of segment signatures comprises information relating to one or more of: a characteristic of road conditions of the journey segment, and/or a characteristic of driver inputs to the vehicle during the journey segment.

14. A non-transitory computer-readable medium having computer-readable instructions stored thereon, the computer-readable instructions executable by at least one processor to cause the performance of operations comprising:
generating a vehicle fleet specific signature dataset for use with a vehicle fleet, the generating comprising:
selecting a first segment signature as a candidate segment signature comprising data relating to a first journey traveled by a first vehicle not in the vehicle fleet, wherein the candidate segment signature comprises feature data relating to a segment of the first journey where the first journey has been subdivided into a plurality of segments, wherein the feature data comprises information relating to vehicle type of the first vehicle, wherein at least some of the data in the candidate segment signature is not present in the vehicle fleet specific signature dataset;

selecting a second segment signature as a test segment signature comprising data relating to a second journey traveled by a second vehicle in the vehicle fleet, wherein the test segment signature comprises feature data relating to a segment of the second journey where the journey has been subdivided into a plurality of segments, wherein the feature data comprises information relating to vehicle type of the second vehicle;

encoding data in the candidate segment signature into a candidate vector and encoding data in the test segment signature into a test vector, determining a level of similarity between the test vector and the candidate vector, wherein the determining involves a comparison of the information relating to vehicle type of the candidate segment signature with the information relating to vehicle type of the test segment signature;

adding the candidate segment signature to the vehicle fleet specific signature dataset if the level of similarity exceeds a predetermined threshold.

15. The non-transitory computer-readable medium of claim 14, the operations further comprising training a data-driven predictor using data from the vehicle fleet specific signature dataset, the predictor for estimating data values for use in controlling the vehicle fleet.

16. The non-transitory computer-readable medium of claim 14, wherein the second vehicle is an electric vehicle.

17. The non-transitory computer-readable medium of claim 14,
wherein the determining a level of similarity comprises calculating a distance between the test vector and the candidate vector, the method further comprising passing the distance through a sigmoid function to generate a similarity score,
wherein the candidate segment signature is added to the vehicle fleet specific signature dataset if the similarity score exceeds a predetermined threshold.

18. The non-transitory computer-readable medium of claim 14, wherein the encoding and the determining a level of similarity involve the use of a Siamese neural network.

19. The non-transitory computer-readable medium of claim 14, the operations further comprising: as new segment signatures relating to journeys traveled by vehicles in the vehicle fleet are created, adding at least some of the new segment signatures to the vehicle fleet specific signature dataset.

20. The non-transitory computer-readable medium of claim 14, wherein the feature data of segment signatures comprises information relating to one or more of: a characteristic of road conditions of the journey segment, and/or a characteristic of driver inputs to the vehicle during the journey segment.

* * * * *